US008821241B2

(12) United States Patent
Hong et al.

(10) Patent No.: US 8,821,241 B2
(45) Date of Patent: Sep. 2, 2014

(54) METHOD, APPARATUS, AND COMPUTER READABLE STORAGE FOR IMPLEMENTING A WAGER GAME

(76) Inventors: Hwei-Wen Wayne Hong, Alameda, CA (US); Ivan E. Hong, Alameda, CA (US)

( * ) Notice: Subject to any disclaimer, the term of this patent is extended or adjusted under 35 U.S.C. 154(b) by 8 days.

(21) Appl. No.: 13/166,774

(22) Filed: Jun. 22, 2011

(65) Prior Publication Data

US 2012/0108308 A1 May 3, 2012

Related U.S. Application Data

(60) Provisional application No. 61/408,905, filed on Nov. 1, 2010, provisional application No. 61/422,299, filed on Dec. 13, 2010, provisional application No. 61/452,759, filed on Mar. 15, 2011.

(51) Int. Cl.
*A63F 13/00* (2014.01)
*G07F 17/32* (2006.01)

(52) U.S. Cl.
CPC .......... *G07F 17/326* (2013.01); *G07F 17/3293* (2013.01)
USPC .................. 463/13; 463/16; 463/20; 463/25; 273/274; 273/292; 273/304

(58) Field of Classification Search
USPC ................ 463/11–13, 16–20, 25, 26, 40–42; 273/274, 292, 304
See application file for complete search history.

(56) References Cited

U.S. PATENT DOCUMENTS

| | | | | |
|---|---|---|---|---|
| 5,584,486 | A * | 12/1996 | Franklin | 273/292 |
| 5,597,162 | A * | 1/1997 | Franklin | 273/292 |
| 5,863,041 | A * | 1/1999 | Boylan et al. | 273/292 |
| 6,811,153 | B1 * | 11/2004 | Ko | 273/292 |
| 7,441,778 | B2 * | 10/2008 | Waken | 273/274 |
| 8,262,450 | B1 | 9/2012 | Lubin | |
| 2010/0090405 | A1 * | 4/2010 | Snow | 273/292 |
| 2010/0096807 | A1 * | 4/2010 | Twitchen et al. | 273/292 |
| 2012/0286474 | A1 | 11/2012 | Lubin | |

* cited by examiner

*Primary Examiner* — Sunit Pandya
(74) *Attorney, Agent, or Firm* — Muskin & Farmer LLC

(57) ABSTRACT

A casino wagering game wherein a player makes a wager and then a dealer and the player are each dealt respective hands. The player and dealer split their respective hand into a high hand and a low hand. Each hand is evaluated to see if it contains a "lucky break" which is a predefined subset of all hands. If the player has a lucky break and the dealer does not, then the player wins. If the dealer has a lucky break and the player does not, then the player loses. If both the player and the dealer have lucky breaks then the wager is resolved based on a comparison of the hands. If neither the player nor the dealer have lucky breaks, then the wager is also resolved based on a comparison of the hands. In addition to physical playing cards, the game can be played using physical Mah-jong tiles. The game can also be played in electronic form on a computer, video terminal, portable device, and at an online casino.

20 Claims, 26 Drawing Sheets

801

802

803

| Outcome | #(Outcome) | P(Outcome) | Payout | Value |
|---|---|---|---|---|
| Dealer doesn't qualify. | 1338455 | 0.01338455 | 0 | 0 |
| Player has at least Pair/Straight, dealer does not. | 21645024 | 0.21645024 | 1 | 0.21645024 |
| Dealer has at least Pair/Straight, player does not. | 22073528 | 0.22073528 | -1 | -0.22073528 |
| Player wins both hands. | 11184966 | 0.11184966 | 1 | 0.11184966 |
| Player wins two-card hand, copies three-card hand. | 464404 | 0.00464404 | 0 | 0 |
| Player wins two-card hand, loses three-card hand. | 15400304 | 0.15400304 | 0 | 0 |
| Player copies two-card hand, wins three-card hand. | 691092 | 0.00691092 | 0 | 0 |
| Player copies both hands. | 37994 | 0.00037994 | -1 | -0.00037994 |
| Player copies two-card hand, loses three-card hand. | 739338 | 0.00739338 | -1 | -0.00739338 |
| Player loses two-card hand, wins three-card hand. | 14359012 | 0.14359012 | 0 | 0 |
| Player loses two-card hand, copies three-card hand. | 468798 | 0.00468798 | -1 | -0.00468798 |
| Player loses both hands. | 11597085 | 0.11597085 | -1 | -0.11597085 |
| Totals: | 100,000,000 | 1 | Return: | -2.09% |

FIGURE 14A

| Outcome | #(Outcome) | P(Outcome) | Payout | Value |
|---|---|---|---|---|
| Dealer doesn't qualify. | 35,937,399,859,200 | 0.028431028 | 0 | 0 |
| Player has at least Pair/Straight, dealer does not. | 162,054,535,248,000 | 0.128205633 | 1 | 0.128205633 |
| Dealer has at least Pair/Straight, player does not. | 168,020,258,342,400 | 0.132925275 | -1 | -0.132925275 |
| Player wins both hands. | 227,082,566,462,400 | 0.17965103 | 1 | 0.17965103 |
| Player wins two-tile hand, copies three-tile hand. | 6,328,982,217,600 | 0.005007025 | 0 | 0 |
| Player wins two-tile hand, loses three-tile hand. | 199,106,408,606,400 | 0.157518351 | 0 | 0 |
| Player copies two-tile hand, wins three-tile hand. | 3,981,148,444,800 | 0.003149592 | 0 | 0 |
| Player copies both hands. | 206,634,412,800 | 0.000163474 | -1 | -0.000163474 |
| Player copies two-tile hand, loses three-tile hand. | 4,614,347,520,000 | 0.003650532 | -1 | -0.003650532 |
| Player loses two-tile hand, wins three-tile hand. | 214,424,984,016,000 | 0.169637282 | 0 | 0 |
| Player loses two-tile hand, copies three-tile hand. | 6,342,406,358,400 | 0.005017646 | -1 | -0.005017646 |
| Player loses both hands. | 235,920,726,028,800 | 0.186643132 | -1 | -0.186643132 |
| Totals: | 1,264,020,397,516,800 | 1 | Return: | -2.05% |

FIGURE 14B

METHOD, APPARATUS, AND COMPUTER READABLE STORAGE FOR IMPLEMENTING A WAGER GAME

CROSS REFERENCE TO RELATED APPLICATIONS

This application claims benefit to provisional application 61/408,905, filed on Nov. 1, 2010, which is incorporated by reference herein in its entirety. This application also claims benefit to provisional application 61/422,299, filed on Dec. 13, 2010, which is incorporated by reference herein in its entirety. This application also claims benefit to provisional application 61/452,759, filed on Mar. 11, 2011, which is incorporated by reference herein in its entirety.

BACKGROUND OF THE INVENTION

1. Field of the Invention

The present general inventive concept is directed to a method, apparatus, and computer readable storage medium directed to a casino wagering game.

2. Description of the Related Art

Texas Holdem Poker is a popular casino live game. In this game, every player uses 7 cards to make a highest 5 card poker hand. Standard poker rankings are used to rate the 5 card hands. Every individual's 7-card hand includes 5 community cards that are shared by all players, and 2 individual cards. In a live game, every player plays against all other players in order to win the pot. A recently introduced Ultimate Texas Holdem depicts a Holdem-like 7 card casino table game where every player plays against the dealer only, not other players.

Pai Gow Poker is a well know casino table game. The original concepts are derived from Chinese Pai Gow game where tiles are used to play. In the tile game, the players and the dealer each receive four tiles to set the low and high hands, and each player competes his low/high hands against the dealer's low/hand hands based upon certain pre-determined rankings In a card game setting, Pai Gow Poker plays with a deck of 52 poker cards plus the Joker. Each player and the dealer receive seven cards to set the low and high hands. The low hand contains two cards and the high hand five cards. Each player's hand competes his low/high hands against the dealer's low/hand hands based upon the regular poker rankings For the 2-card low hand, the highest hand is a pair of Aces and for the 5-card high hand, the rankings are, from high to low, royal flush, straight flush, 4 of a kind, full house, 3 of a kind, two pairs, one pair, Ace high and other singletons. A number of Pai Gow side bets have been introduced to generate additional excitement for players as well as additional action (and hence profit) for the casino.

Mahjong is a Chinese game played by four players against one another. It is a game of skill, strategy, intelligence, calculation and luck. Depending on the variation which is played, luck can be anything from a minor to a dominant factor in success. The object of the game is to build a "Mahjong" (or "Hu" in Chinese) which consists of a pair with suits of threes from the initially dealt thirteen to sixteen tiles, or 3X+1 where X is 4 or 5, plus one. The first person to achieve this goal is said to win the game. The game is very popular in Asia but has not attained the same level of popularity on other continents. One reason is the level of sophistication and complexity of the game. Another reason is the use of unfamiliar tiles which are not as well known as other gaming props like playing cards or dice. On the other hand, the tiles attract players because they could enjoy the crashing sound of the tiles and they could touch through the surface of a tile to speculate what the tile is. Mahjong game's attraction comes from the combination of sound, touch and mental competition.

The art of traditional Mahjong can be found on hundreds of web sites in many languages. See U.S. patent publication 2009/0218767, "Apparatus and Method of Using an Apparatus to Conduct a Wagering Game", which describes the fundamentals of a traditional Mahjong and is incorporated by reference herein in its entirety. See also U.S. Pat. No. 6,688,598 by Hsi and U.S. Pat. No. 5,522,595 by Wong. U.S. Pat. No. 6,834,857 uses 72 cards to play a variation of Mahjong which includes drawing new cards and/or exchanging cards.

See also this inventor's U.S. Pat. No. 7,389,989, "Casino Card Game Having Mahjong Attributes", wherein a "Mahjong" hand is defined as 5 cards/tiles, namely one pair plus one straight or trips.

SUMMARY OF THE INVENTION

It is an aspect of the inventive concept to provide for an exciting casino wagering game.

The above aspects can be obtained by a method that includes (a) providing physical elements and a shuffling machine; (b) receiving a main wager from a player; (c) dealing a player's initial hand and a dealer's initial hand using the physical elements; (d) allowing the player to set the player's initial hand into a player's high hand and a player's low hand; (e) allowing the dealer to set the dealer's initial hand into a dealer's high hand and a dealer's low hand; (f) providing wager resolution rules comprising: (g) defining a predefined condition; (h) if the player's high hand and the player's low hand meet the predefined condition and the dealer's high hand and the dealer's low hand do not meet the predefined condition, then the player wins a payout on the main wager; (i) If the player's high hand and the player's low hand do not meet the predefined condition and the dealer's high hand and the dealer's low hand do meet the predefined condition, then the player loses the main wager; (j) If either a) the player's high hand and the player's low hand do not meet the predefined condition and the dealer's high hand and the dealer's low hand do not meet the predefined condition or b) the player's high hand and the player's low hand do meet the predefined condition and the dealer's high hand and the dealer's low hand do meet the predefined condition, then the main wager is resolved based on a comparison between the player's high hand and the dealer's high hand and the player's low hand and the dealer's low hand; and (k) resolving the main wager using the wager resolution rules.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 14A is an illustration of the statistical evaluation of the dealer plays against the player in Break Poker, according to the preferred embodiment. FIG. 14B is an illustration of the statistical evaluation of the dealer plays against the player in Casino Mahjong, according to the preferred embodiment;

DESCRIPTION OF THE PREFERRED EMBODIMENTS

Figure 1A:
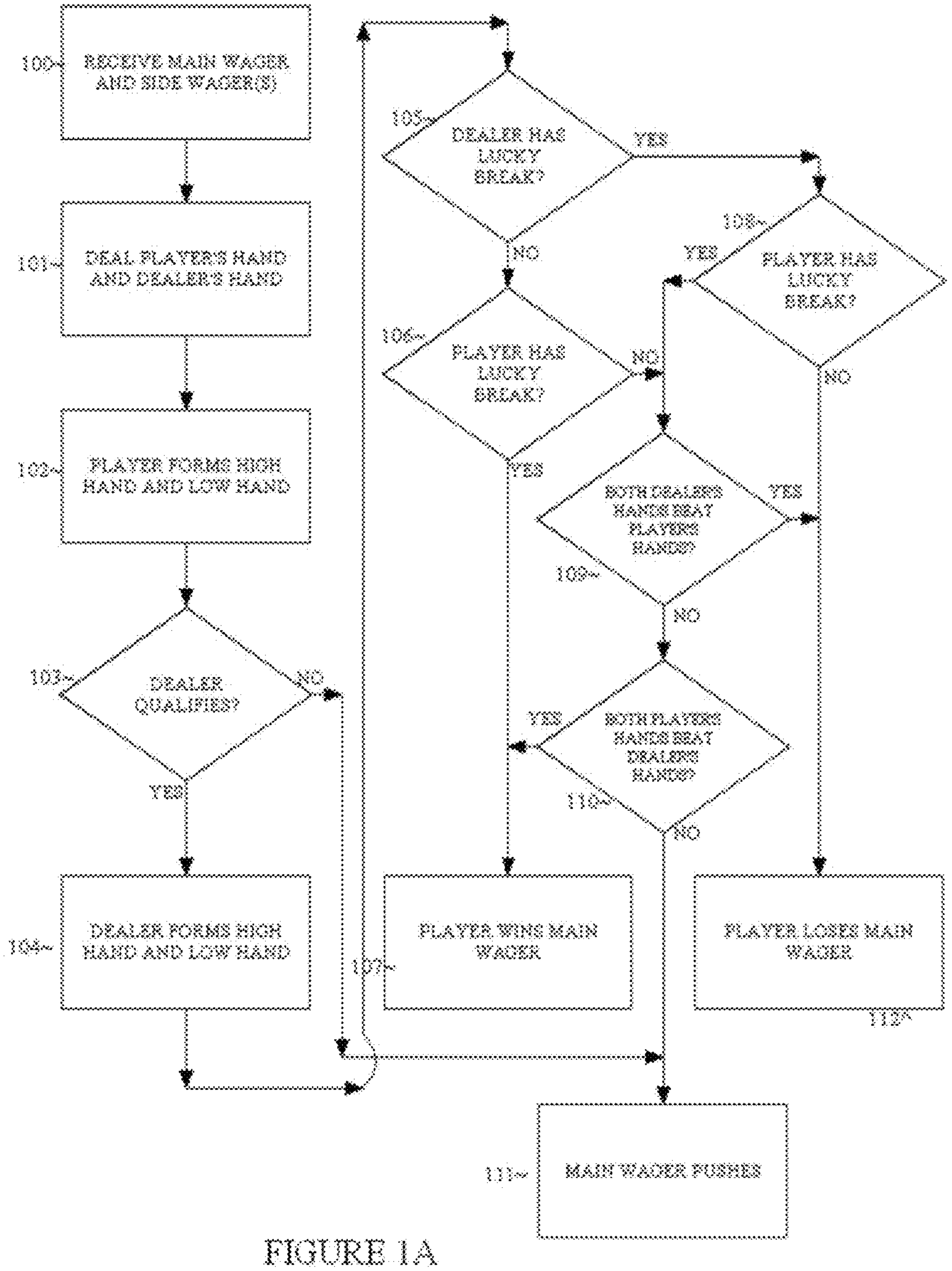
FIG. 1A is a flowchart illustrating an exemplary method to play a wagering game, according to an embodiment.

Reference will now be made in detail to the presently preferred embodiments of the invention, examples of which are illustrated in the accompanying drawings, wherein like reference numerals refer to like elements throughout.

The present inventive concept introduces a special hand pattern and depicts an innovative way of playing wager games. In one embodiment, the present invention illustrates a seven card game that is simplistic, fast paced and it provides a very high degree of excitement due to the innovative specification of a special poker hand pattern. Moreover, the same game rules can be played with specially designed Mahjong-like tiles. It will become apparent that the variants of the invention include wager games playing with five or more cards, tiles, or using an electronic medium.

The present inventive includes one mandatory wager and numerous side wagers that are optional and would typically be placed when the main wager is placed. The wagers can be placed in any amount (within the set limits). One preferred embodiment of the inventive concepts shall be called Break Poker in this description.

FIG. 1A is a flowchart illustrating an exemplary method to play a wagering game, according to an embodiment. FIG. 1A illustrates how to resolve a main wager of the game, while side wagers can be resolved separately.

The game Break Poker is played using a standard deck of 52 cards plus a Joker (the joker can become any card based on the preference of the player (or dealer) that is dealt the joker.

In FIG. 1A, the method starts with operation 100, wherein players place a main bet and optionally three bonus bets: Break Bonus, Dealer Break and 3 Card Bonus. This can be done as known in the art, wherein players use chips (directly redeemable for cash at a casino cashier) and place them in respective betting circles on a layout on a gaming table.

From operation 100, the method proceeds to operation 101, wherein the dealer and each player's position are dealt 7 cards, face down, regardless if the position has a player or not. In another embodiment, the cards are dealt only to the wager positions (where players are).

From operation 101, the method proceeds to operation 102, wherein each player forms a three card high hand and a two card low hand from their respective seven card hand (while not using two cards). The high hand must rank higher (according to poker ranks) than the low hand.

The object of the game is to use 5 of the 7 cards and make a two-card low hand, consisting of a pair, and a three-card high hand, consisting of a straight or three-of-a-kind (trips). This is called a Lucky Break. The two remaining cards will be discarded. The Joker can be used in a straight, trips, or as an Ace Unlike in conventional poker, a rank of flush is typically not considered in the game described herein (although in another embodiment a flush can count as a rank).

From operation 102, the method proceeds to operation 103, which determines whether the dealer qualifies. The dealer qualifies if the dealer's has at least one of: a pair, straight, trips, or an ace high. If the dealer's hand does not qualify, then the method proceeds to operation 111, wherein the player's main wager pushes (while the optional side wagers remain in play).

If the dealer qualifies in operation 103, then the method proceeds to operation 104, wherein the dealer forms his/her high hand and low hand. This is done according to a predefined "House Way" (a complete set of rules for all scenarios) and the human dealer has no discretion on how to play his/her hand. The dealer sets his five card hand according to the house way (the house way also dictates which two cards out of the original seven cards to discard). An embodiment of the House Way will be described below in more detail.

From operation 104, the method proceeds to operation 105, which determines if the dealer has a lucky break (a pair as the low hand and a high hand of either a straight or three of a kind).

If the dealer does not have a lucky break in operation 105, then the method proceeds to operation 106 which determined in the player has a lucky break. If in operation 106, the player does have a lucky break, then the method proceeds to operation 107.

In operation 107, the player wins the main wager and is paid a payout based on the player's main wager. The payout on the main wager can be even money or any other payout as well.

If in operation 106, the player does not have a lucky break, then the method proceeds to operation 109 which determines if both dealer's hands (the high hand and the low hand) beat their counterpart player's hands (the high hand and the low hand), and if so, then the method proceeds to operation 112.

In operation 112, the player loses the main wager and it is taken by the dealer.

If in operation 109, both dealer hands (the high hand and the low hand) do not beat their counterpart player's hands (the high hand and the low hand) then the method proceeds to operation 110. If in operation 109, both dealer's hands (the high hand and the low hand) do beat their counterpart player's hands (the high hand and the low hand) then the method proceeds to operation 112. See below for a more detailed definition of when a dealer hand "beats" a player hand.

In operation 112, the player loses the main wager and it is taken by the dealer.

In operation 110, it is determined whether both player's hands (the high hand and the low hand) beat their counterpart dealer's hands (the high hand and the low hand), and if so then the method proceeds to operation 107. If both player's hands (the high hand and the low hand) do not beat their counterpart dealer's hands (the high hand and the low hand), then the method proceeds to operation 111. If in operation 110 both player's hands (the high hand and the low hand) do both beat their counterpart dealer's hands (the high hand and the low hand), then the method proceeds to operation 107. In order for a player hand to beat a dealer hand the player hand must be higher (e.g., rank higher) than the player hand.

In operation 111, the player's main wager pushes (neither wins nor loses).

In operation 105, if the dealer has a lucky break then the method proceeds to operation 108. Operation 108 determines whether the player has a lucky break. If in operation 108 the player has a lucky break, then the method proceeds to operation 109. If in operation 108, the player does not have a lucky break, then the method proceeds to operation 112.

Note that operations 109 to 110 compare the player's hands and the dealer's hands (because either the player and dealer both have lucky breaks or neither the player and dealer has lucky breaks). During the comparison, the dealer's high hand competes against the player's high hand and the dealer's low hand competes against the player's low hand. The dealer wins the low/high hand with equal ranking (can be considered a "copy"). In other words, if both the dealer's hand (low or high) is the same (or better) as the player's counterpart hand, then the dealer is considered to have a higher (winning) hand. Thus, this can be considered that in case of a tie, the dealer wins. Language which means the same thing is "if the dealers hand is greater than or equal to the player's hand" or "if the dealers hand is greater than equal to the player's hand" or "if the dealers hand is ≥ the players hand." Thus, for example, if the dealer's hand is "2/2 and 6/7/8" and the player's hand is "2/2 and 6/7/8" since both of these hands are ties, the dealer would be considered to beat both of these hands (and go from operation 109 to operation 112). If the dealer's hand is "2/2 and 6/7/8" and the player's hand is "2/2 and 5/6/7" then the dealer also wins because both of the dealer's hands are greater than equal to the respective player's hands (the low hand is a tie which the dealer wins and the dealer beats the player on the high hand). The player wins if the player's high hand beats the dealer's high hand and player's low hand beats the dealer's low hand. The player pushes when one of the low and high hands win and the other one loses. The player loses when both the low and high hands lose. In general, a hand is considered to beat (or rank higher than or is better than) an other hand when the hand has a higher (or better or stronger) poker rank than the other hand, using standard poker rankings or the rankings described herein.

It is noted that the flow illustrated in FIG. 1A is merely one example and the logical determinations can be made in any other sensible order as well.

Figure 1B:
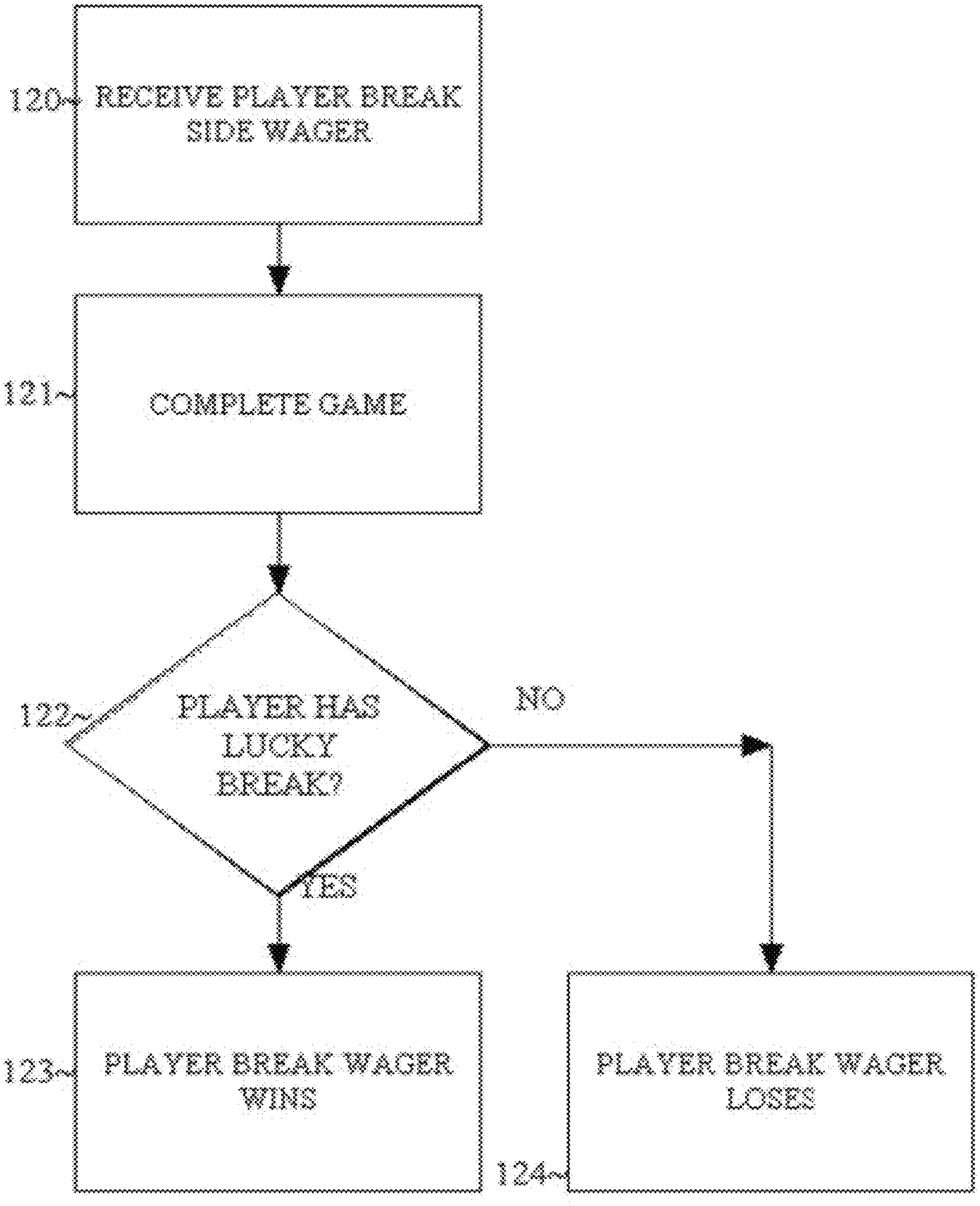
FIG. 1B is a flowchart illustrating an exemplary method to resolve a player break side wager, according to an embodiment.

FIG. 1B is a flowchart illustrating an exemplary method to resolve a player break side wager, according to an embodiment.

In operation 100, the player can make an optional player break side wager. The player is wagering (hoping) that the player will receive a lucky break when the player is dealt his/her hand in operation 101.

The method begins with operation 120, which receives the player break side wager. This is actually received in operation 100.

From operation 100, the method proceeds to operation 121, which completes the game. This includes operations 100-112 (all operations in FIG. 1A).

After the game is completed and the main wager is resolved, the method proceeds to operation 122, which determines whether the player has a lucky break. If the player does not have a lucky break, then the method proceeds to operation 124, wherein the player break side wager loses (is taken by the dealer).

If in operation 122 it is determined that the player has a lucky break, then the method proceeds to operation 123, wherein the player's player break wager wins and is paid a payout. The payout is determined using a paytable, such as those illustrated in Table I which gives five different examples of possible paytables. For example, the "Pair+Straights" means that the hand has a two card pair plus a three card straight.

TABLE I

| Lucky Break Hand | Payout 1 | Payout 2 | Payout 3 | Payout 4 | Payout 5 |
|---|---|---|---|---|---|
| Five Aces | 200 | 200 | 200 | 200 | 200 |
| Five of a Kind, 2s-Ks | 100 | 100 | 100 | 100 | 100 |
| Pair + AAA | 6 | 5 | 6 | 10 | 15 |
| Pair + JJJ-KKK | 6 | 5 | 6 | 8 | 8 |
| Pair + Trips | 6 | 5 | 6 | 5 | 5 |
| Pair + AKQ | 3 | 3 | 4 | 3 | 3 |
| Pair + Straights | 1 | 1 | 1 | 1 | 1 |
| House Edge | 7.24% | 11.38% | 3.82% | 5.42% | 3.16% |

Figure 1C:
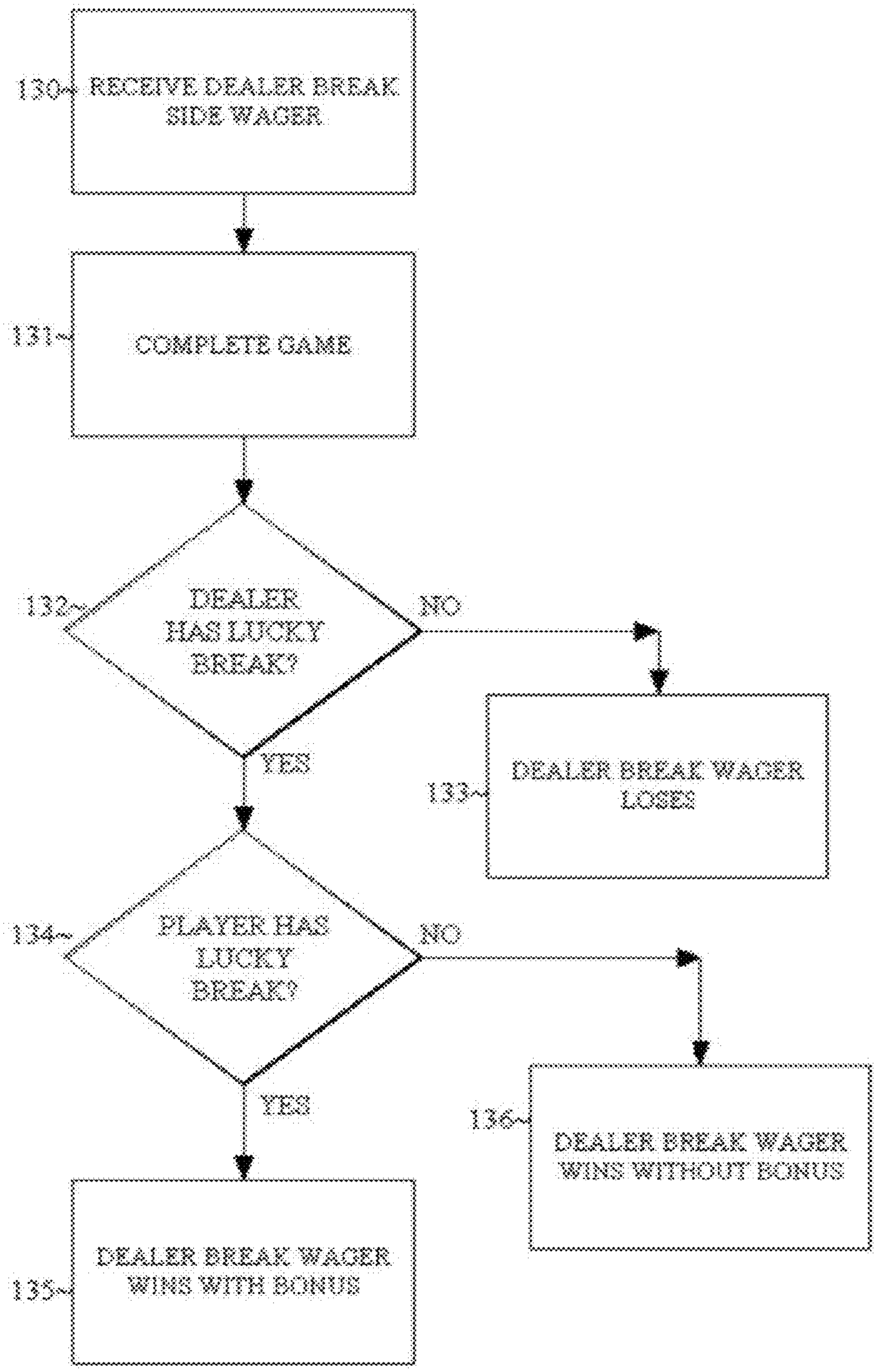
FIG. 1C is a flowchart illustrating an exemplary method to resolve a dealer break side wager, according to an embodiment.

FIG. 1C is a flowchart illustrating an exemplary method to resolve a dealer break side wager, according to an embodiment.

In operation 100, the player can make an optional dealer break side wager. The player is wagering (hoping) that the dealer will receive a lucky break when the dealer is dealt his/her hand in operation 101.

The method begins with operation 130, which receives the player break side wager. This is actually received in operation 100.

From operation 130, the method proceeds to operation 131, which completes the game. This includes operations 100-112 (all operations in FIG. 1A).

After the game is completed and the main wager is resolved, the method proceeds to operation 132, which determines whether the dealer has a lucky break. If the dealer does not have a lucky break, then the method proceeds to operation 133, wherein the dealer break side wager loses (is taken by the dealer).

If in operation 132, it is determined that the dealer has a lucky break, then the method proceeds to operation 134, which determines whether the player also has a lucky break. If in operation 134, the player does not have a lucky break, then the method proceeds to operation 136, wherein the dealer break wager wins without a bonus payment (for example, the dealer break wager is paid 1:1).

If in operation 134, it is determined that the player also has a lucky break, then the method proceeds to operation 135 wherein the dealer break wager wins with a bonus payout (e.g., the dealer break wager is paid 4:1). Of course, when the player makes the dealer break wager the player hopes that both the player and dealer have lucky breaks (because this pays the player more than if only the dealer has a lucky break).

Figure 1D:
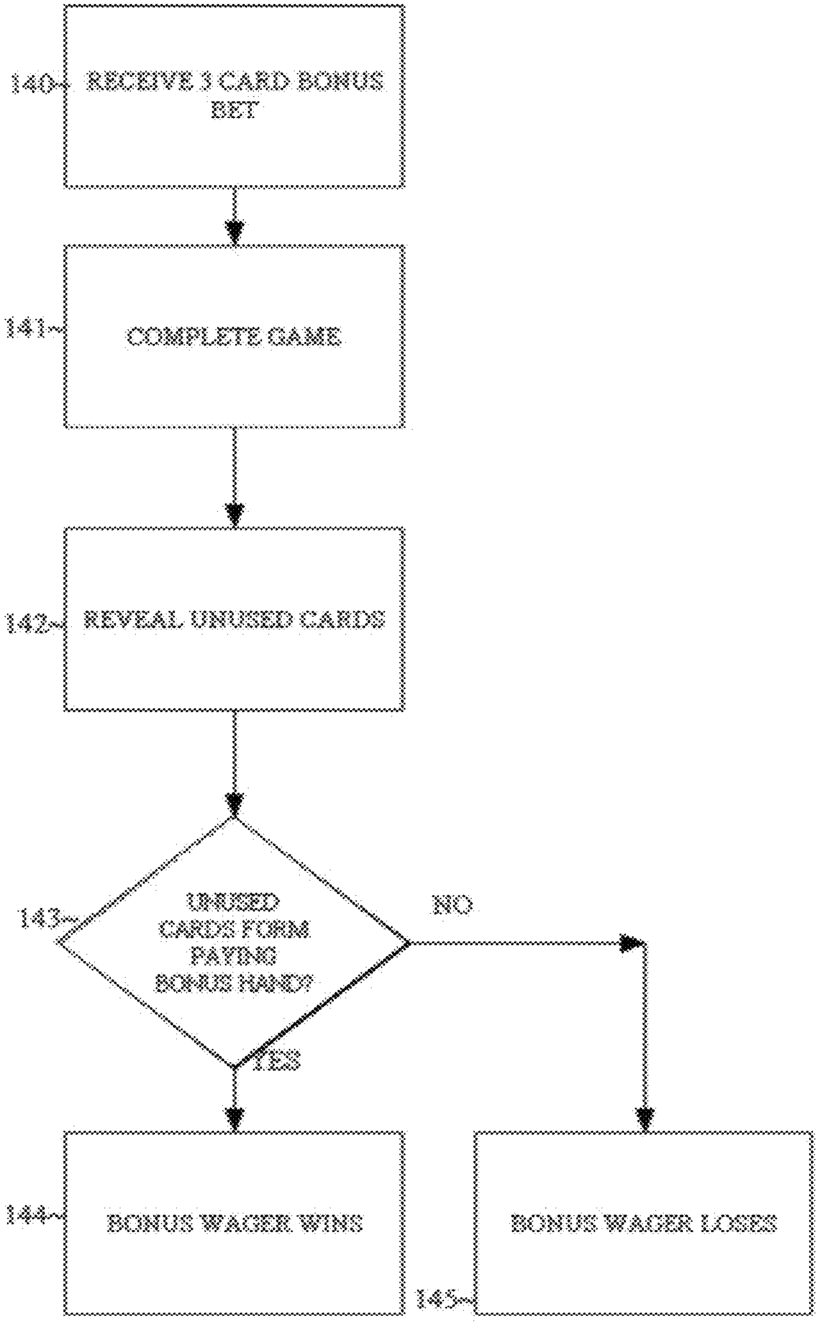
FIG. 1D is a flowchart illustrating an exemplary method to resolve a 3-card side bonus side wager, according to an embodiment.

FIG. 1D is a flowchart illustrating an exemplary method to resolve a 3-card bonus side wager, according to an embodiment.

The method begins with operation 140, which receives the player break side wager. This is actually received in operation 100.

From operation 140, the method proceeds to operation 141, which completes the game. This includes operations 100-112 (all operations in FIG. 1A).

From operation 141, the unused cards are revealed. The unused cards are the cards that are not dealt to any player or the dealer. For example, a table would have 6 players plus a dealer. That is seven hands of seven cards each dealt out, equals 49 cards. Since (in one embodiment) the game uses a standard 52 card deck plus a joker (53 cards), there are four cards left over (53-49). Of these four cards, the first three (or the last three) could be used to resolve the three-card bonus side wager.

From operation 141, the method proceeds to operation 142, which reveals the unused cards. The three cards that are used to resolve this wager are revealed. In other embodiments, this side wager can use other amounts of cards other than three.

From operation 142, the method proceeds to operation 143, which determines whether the unused cards form a paying bonus hand. This can be done using a table, for example such as that in Table II which shows two possible paytables (although of course other paytables can be devised as well).

TABLE II

| 3 Card Hand | Payout 1 | Payout 2 |
|---|---|---|
| A-A-A or A-A-Joker | 50 to 1 | 50 to 1 |
| 3 of a Kind | 15 to 1 | 15 to 1 |
| Straight | 4 to 1 | 5 to 1 |
| A-A or A-Joker | 4 to 1 | 5 to 1 |
| Pair | 1 to 1 | 1 to 1 |
| A-high or Joker-high | Push | Lose |
| All others | Lose | Lose |
| House Edge | 5.7438% | 4.7891% |

From operation 143, if the unused cards do not comprise a paying hand, then the method proceeds to operation 145, wherein the bonus wager loses.

If in operation 143, the unused cards comprise a paying hand, then the method proceeds to operation 144, wherein the player is paid the respective payout on the player's 3 card bonus wager (the respective payout multiplied by the wager amount of the 3 card bonus wager).

In one embodiment, the dealer would deal cards to all six player positions even if there is no player playing there. In another embodiment, the dealer would only deal cards to positions where there are players. In this embodiment, the three cards used to resolve the 3 card bonus wager would then just simply be the next three cards dealt (after all players and the dealer have all been dealt their initial seven card hand).

In yet a further side wager, a progressive side wager can be offered. This is typically a $1 bet and a certain percentage of the bet goes to the jackpot meter. The setting of this bet requires electronics apparatus to monitor and manage the wagers and jackpot size. In one embodiment, the a payout table using a progressive payout is illustrated in Table III.

TABLE III

| Hand | Payout |
|---|---|
| 7 Cards: | |
| KK plus AAAA-Joker | 100% |
| Any pair plus AAAA-joker | 10% |
| AA plus 5-of-a-kind | ??? |
| Any pair plus 5-of-a kind | ??? |
| all others | lose |
| 5 Cards: | |
| AAAA-Joker | ??? |
| Other 5 of a kind | ??? |
| Pair/AAA or Pair/AA-joker | ??? |
| all others | lose |

The paytables illustrated in Table III are of course merely one example of payouts that can be used. The question marks represent payouts that can be determined by a game designer. The 100% top payout means that when the player gets the KK plus AAAA-Joker the player wins the entire progressive jackpot pool. The 10% payout means that when the player gets any pair plus AAAA-joker the player wins 10% of the jackpot pool. The jackpot pool is fed by a percentage of the jackpot bet being used to add to the pool. For example, for a $1 progressive wager, 0.10 would go to the house and 0.90 would be added to the jackpot meter.

With regard to the house way, if the dealer's hand does qualify (i.e. the 7-card hand is lower than Ace high), then the main bet pushes and the game ends (although side bets are still resolved). Note that the majority of hands qualify. In another embodiment, the qualifying hand is dealer's 7-card hand contains an Ace-King high or better. In an embodiment (for example when the dealer's qualifying hand is Ace-King high or better), resolution of the main wager could be modified such that if both the player and the dealer have a lucky break, the main wager would always push (instead of having to compare the hands).

If the dealer qualifies, then the dealer will set the dealer's hand using the cards dealt to the dealer in operation 101. One embodiment of the house way is shown in Table IV.

TABLE IV a. If the dealer can make a hand of Pair/Trips (a Lucky Break), he does so, putting the highest pair possible for the two-card hand.
b. Otherwise, if the dealer can make a hand of Pair/Straight (a Lucky Break), he does so, putting the highest pair possible for the two-card hand.
c. Otherwise, if the dealer can make a hand of No Pair/Trips, he does so, putting the highest possible two cards for the two-card hand.

TABLE IV-continued d. Otherwise, if the dealer can make a hand of No Pair/Straight, he does so, putting the highest possible two cards for the two-card hand.
e. Otherwise, if the dealer can make a hand of Pair/Pair, he does so, putting the highest possible pair for the two-card hand.
f. Otherwise, if the dealer can make a hand of No Pair/Pair, he does so, putting the highest possible two cards for the two-card hand.
g. Otherwise, the dealer puts the highest possible two cards for the two-card hand.

Figure 2A:
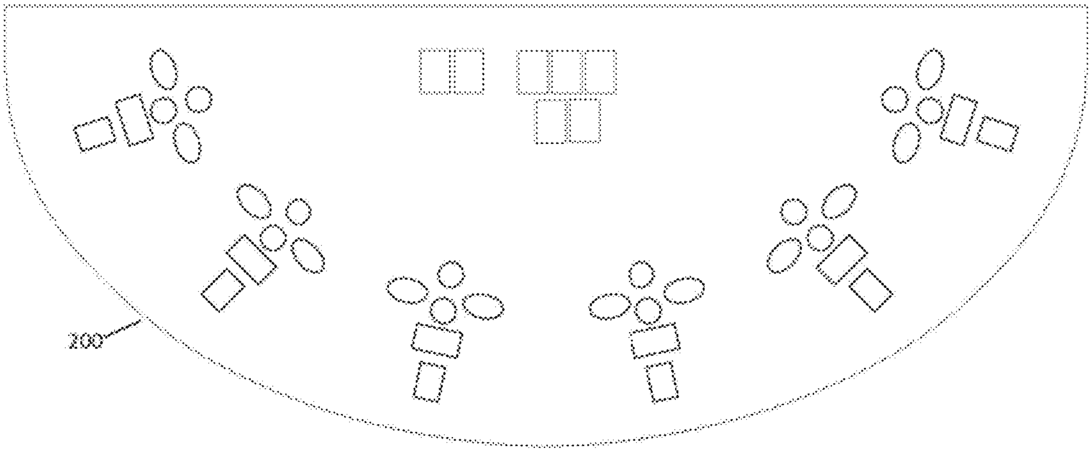
FIG. 2A is an exemplary table layout that can be used to implement wagering game, according to an embodiment.

FIG. 2A is an exemplary table layout that can be used to implement wagering game, according to an embodiment. Area 200 is the table layout for the wager game. There is one dealer position and six player wagering positions.

Figure 2B:
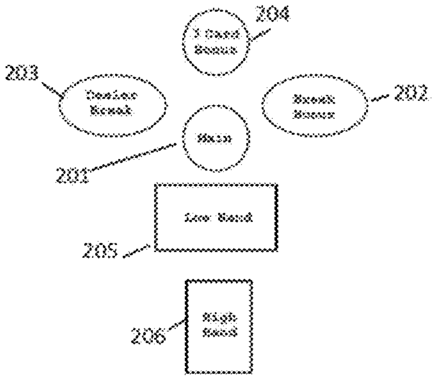
FIG. 2B is an exemplary betting layout used for each player, according to an embodiment.

FIG. 2B is an exemplary betting layout used for each player, according to an embodiment. A main wager betting area 201 is used to place the main bet and there are 3 side wager betting areas: 202 for Break Bonus (see FIG. 1B), 203 for Dealer Break (see FIG. 1C) and 204 for 3 Card Bonus (see FIG. 1D). Areas 205 and 206 are used for the player to palace the 2-card Low and 3-card High hands.

Figure 3:
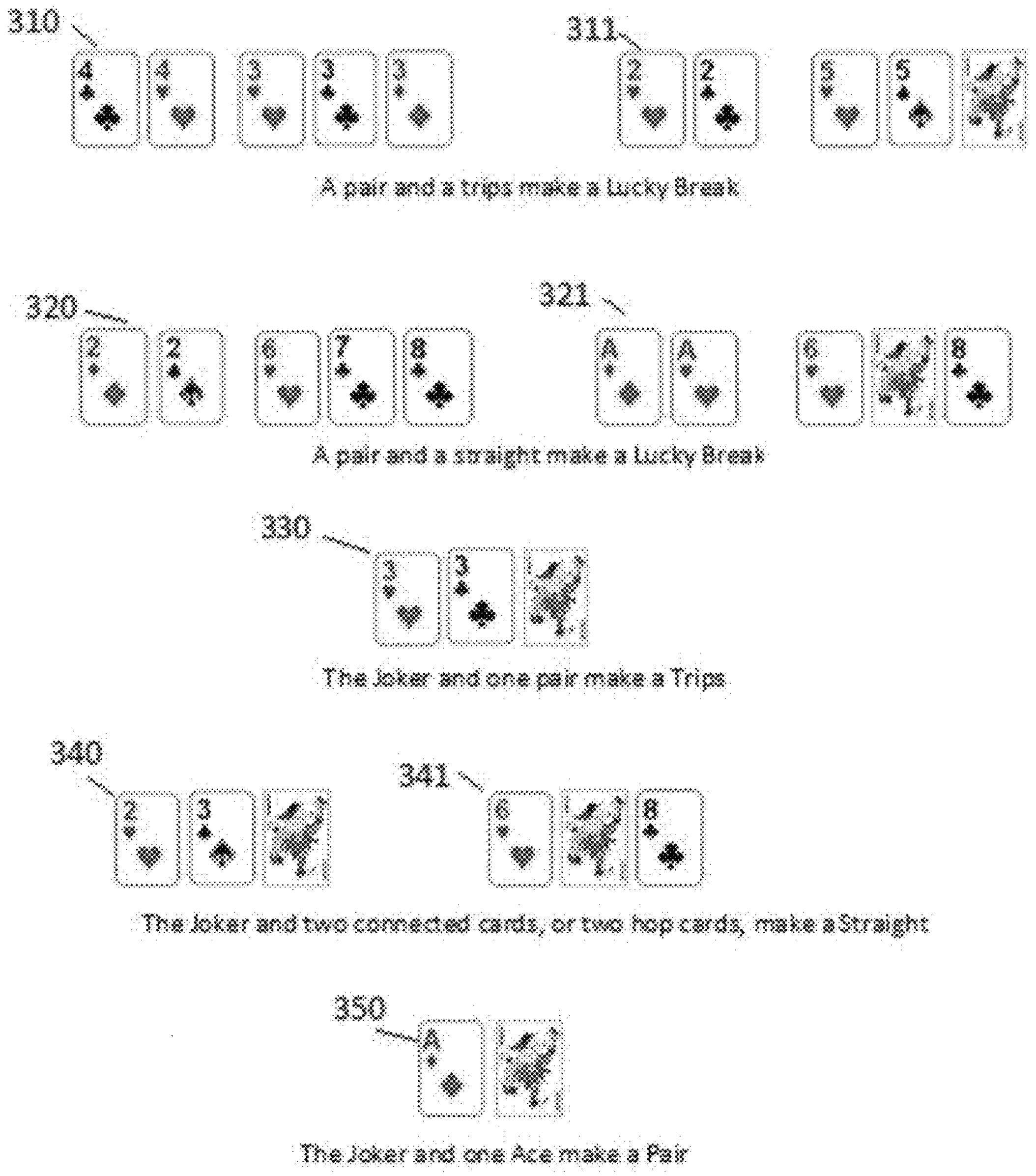
FIG. 3 is an illustration of Lucky Break and the use of Joker in one embodiment of the game.

FIG. 3 is an illustration of Lucky Break and the use of Joker in one embodiment of the game. The "lucky break" is a predefined condition (subset of cards) which is a good hand for both the player and the dealer.

Hand 310 is a Lucky Break of a pair of 4's and a trips of 3's. Hand 311 is a Lucky Break of a pair of 2's and a trips of 5's which includes the Joker. Hand 320 is a Lucky Break with a pair of 2's and a (6,7,8) straight. Hand 321 a Lucky Break with a pair of Ace's and a straight of (6-Joker-8) where Joker substitutes 7.

In the 3-card hand 330, Joker and a pair of 3's form a trips (three of a kind). In hand 340 and 341, (2-3-Joker) and (6-Joker-8) are straights. In the 2-card hand 350 (Ace-Joker) is a pair of Ace's. The joker becomes the best card possible in order to form the best hand it could possibly form (either in the low hand or the high hand).

If a Lucky Break cannot be obtained, the player's three card high hand must be set so that it outranks the two-card low hand. Card value combinations are ranked from highest to lowest as follows: Three-of-a-Kind, Straight, Pairs, High Card Values.

The game is best played with a shuffle machine that deals seven cards per hand. If a shuffle machine is not available, the game will take a longer time to play. A random number generator for deciding the first position to receive cards is not needed, as the player leftmost to the dealer typically receives the first seven cards.

In one embodiment, the game is played with a regular 52 card deck plus one joker. The maximum number of player is six. Every player and the dealer each receive seven cards. For each round of play, every position is dealt seven cards and there are four unused cards. In other embodiments, other numbers of players can play simultaneously (e.g., 2-10) and multiple decks can be used (e.g. 2-10). In addition, the size of the hands are not required to be seven cards, and other hand sizes can be used as well (e.g., six initial cards dealt with a two card low hand and three card high hand; or six initial cards with a two card low hand and a two card high hand; or seven initial cards dealt with a two card low hand and a four card high hand). Numerous hand sizes can be used.

Figure 4:
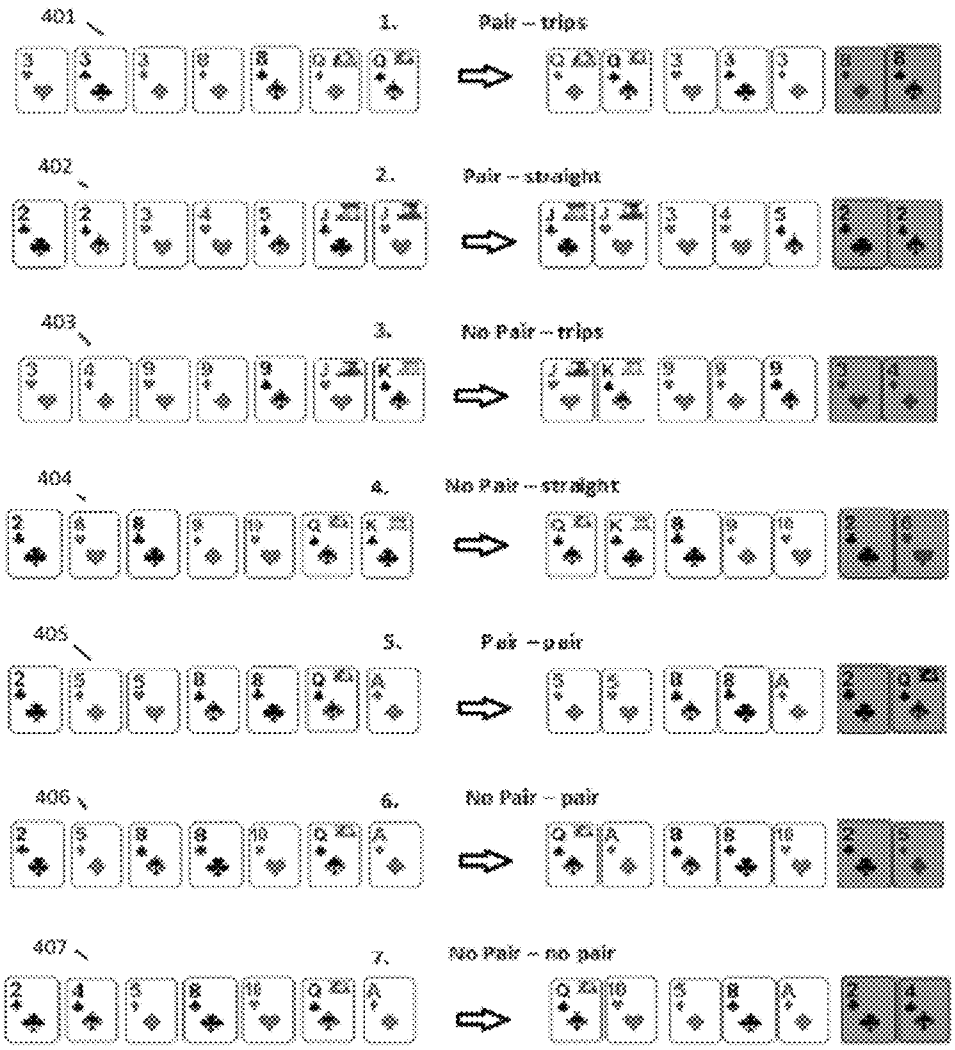
FIG. 4 is an illustration of House Way for Break poker, according to one embodiment.

FIG. 4 is an illustration of the house way, according to an embodiment.

Hand 401-(H3,C3,D3,D8,S8,DQ,SQ) has a Lucky Break of [Q,Q-3,3,3]. Hand 402-(C2,S3,H3,H4,S5,CJ,HJ) has a Lucky Break of [J,J-3,4,5]. Hand 403-(H3,D4,H9,D9,S9,HJ,SK) has a J-K-trips [J,K-9,9,9]. Hand 404-(C2,H6,C8,D9,HT,SQ,CK) has a K-Q-straight of [Q,K-8,9,T]. Hand 405-(C2,D5,H5,S8,C8,SQ,DA) has a pair/pair of [5,5-8,8,A]. Hand 406-(C2,D5,S8,C8,HT,SQ,DA) has a no-pair/pair of [Q,A-8,8,T]. Hand 407-(C2,S4,D5,C8,HT,SQ,DA) has a no-pair/no-pair of [Q,T-5,8,A].

FIGS. 5A to 5E are an illustration of one round of play when the dealer is qualified, according to an embodiment (the 3 card bonus is not shown).

Figure 5A:
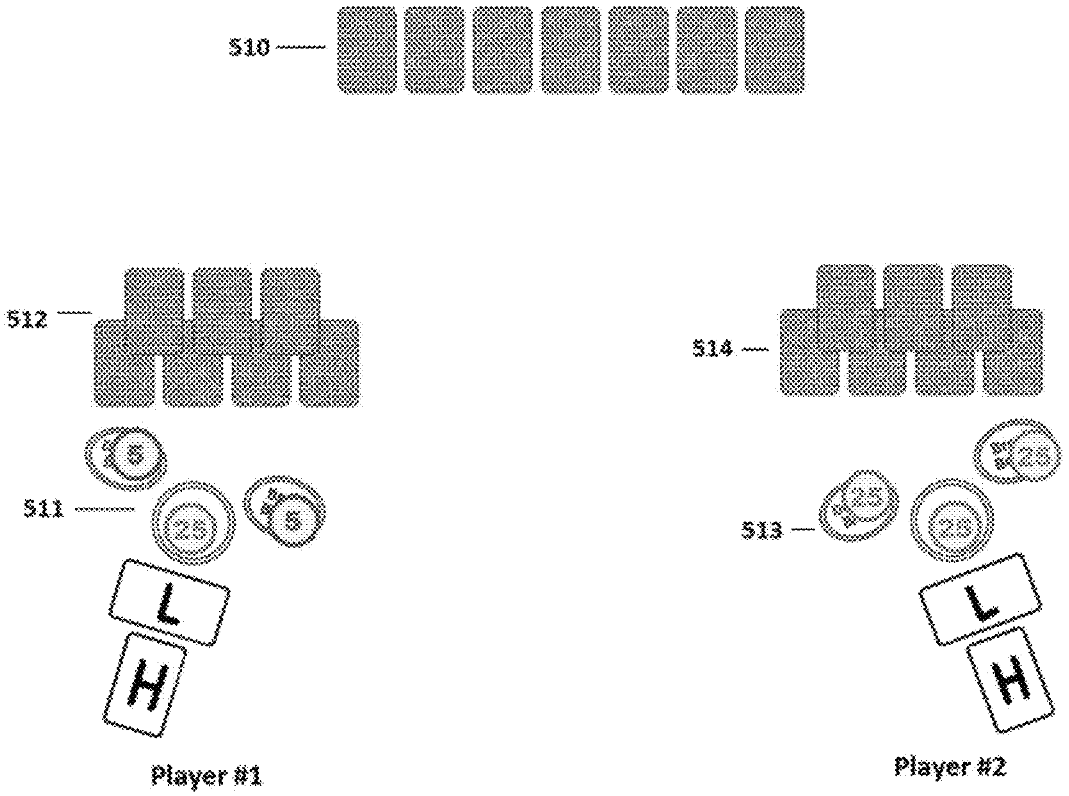
FIGS. 5A-5E are an illustration of one round of play when the dealer is qualified, according to an embodiment.

In FIG. 5A, Player #1 places $25 as the main bet and $5 each for the Dealer Break and Break Bonus bets at area 511 and received 7 cards at 512; player #2 places $25 as the main bet and $25 each for the Dealer Break and Break Bonus at area 513 and receives cards at 514. The dealer receives his 7 cards at area 510.

Figure 5B:
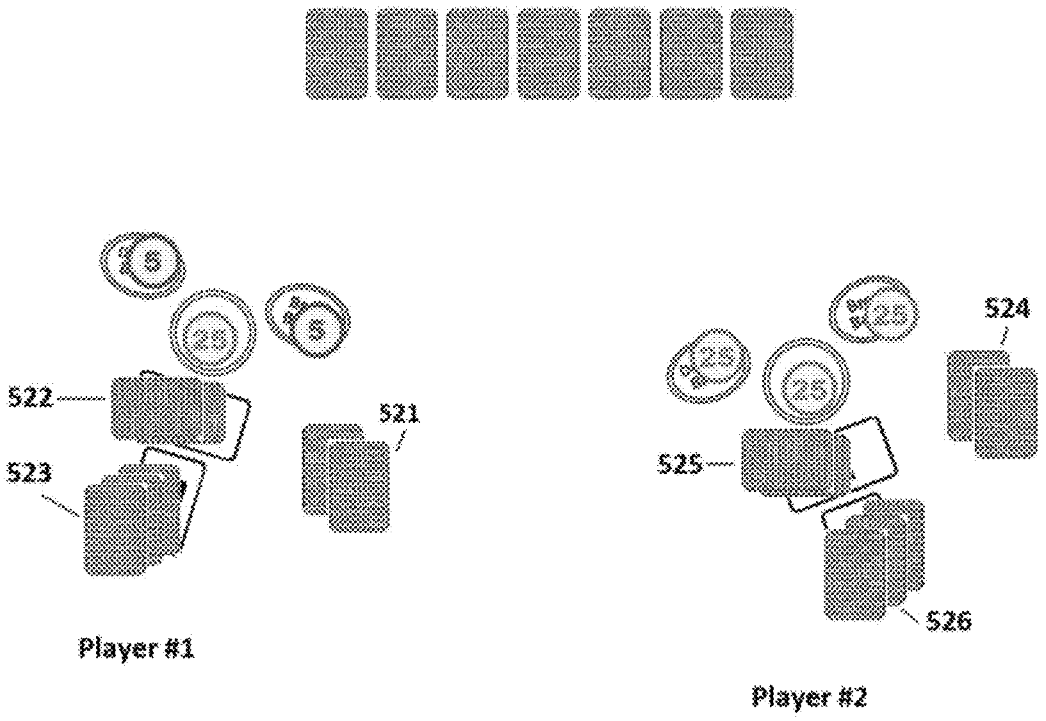

In FIG. 5B, player #1 selects five of his seven cards to make a two-card hand and a three-card hand, with the restriction that the three-card hand must be at least as high in rank as the two-card hand. Player #1 puts down the low and high hands at areas 522 and 523 separately, and puts two discarded cards aside at area 521. Player #2 puts down the low and high hands at areas 525 and 526 separately, and puts two discarded cards aside at area 524.

Figure 5C:
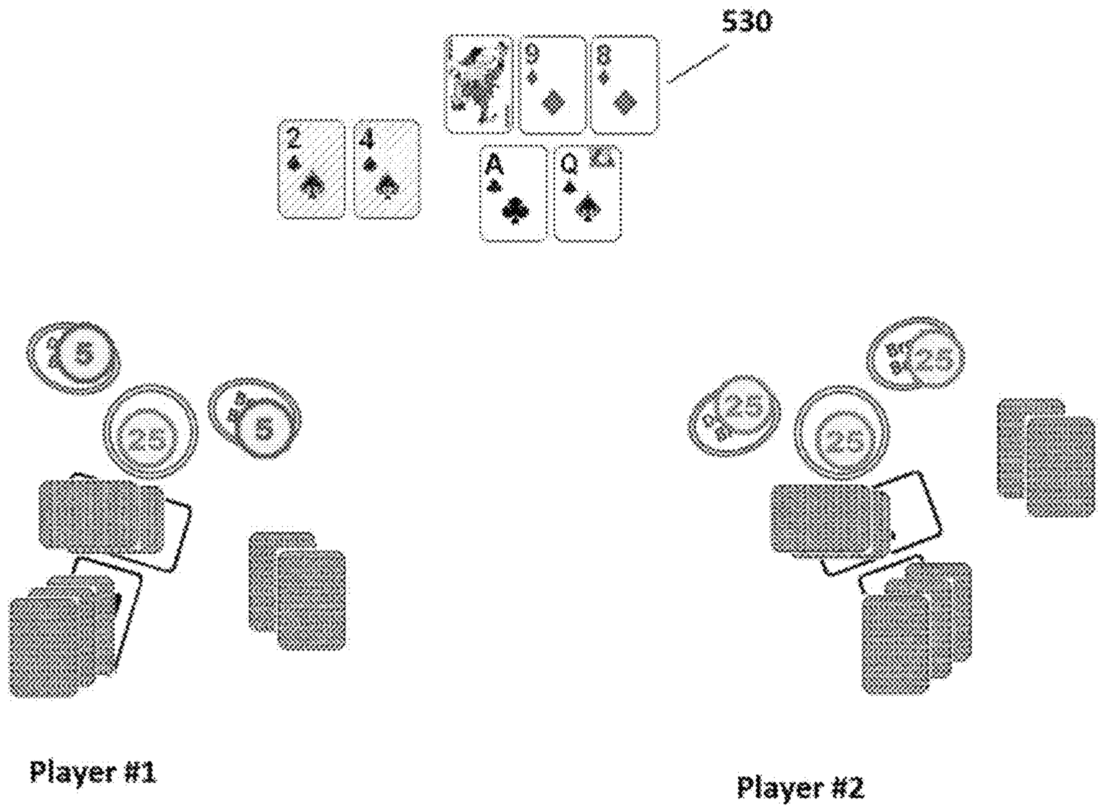

In FIG. 5C, after all players have set their hands, the dealer collects every player's discarded cards and put them away. Next, the dealer sets his 7 card hand according to the House Way. In this exemplary play, area 530 shows the dealer's hand of [Joker-CA-SQ-D9-D8-S4-S2] is qualified. Following the House Ways, the dealer sets his hand as [A-Q, Joker-9-8], discarding [S4-S2]. The dealer has a non-pair/straight hand. In this exemplary play, the dealer will resolve one player's hand at a time starting from player #1.

Figure 5D:
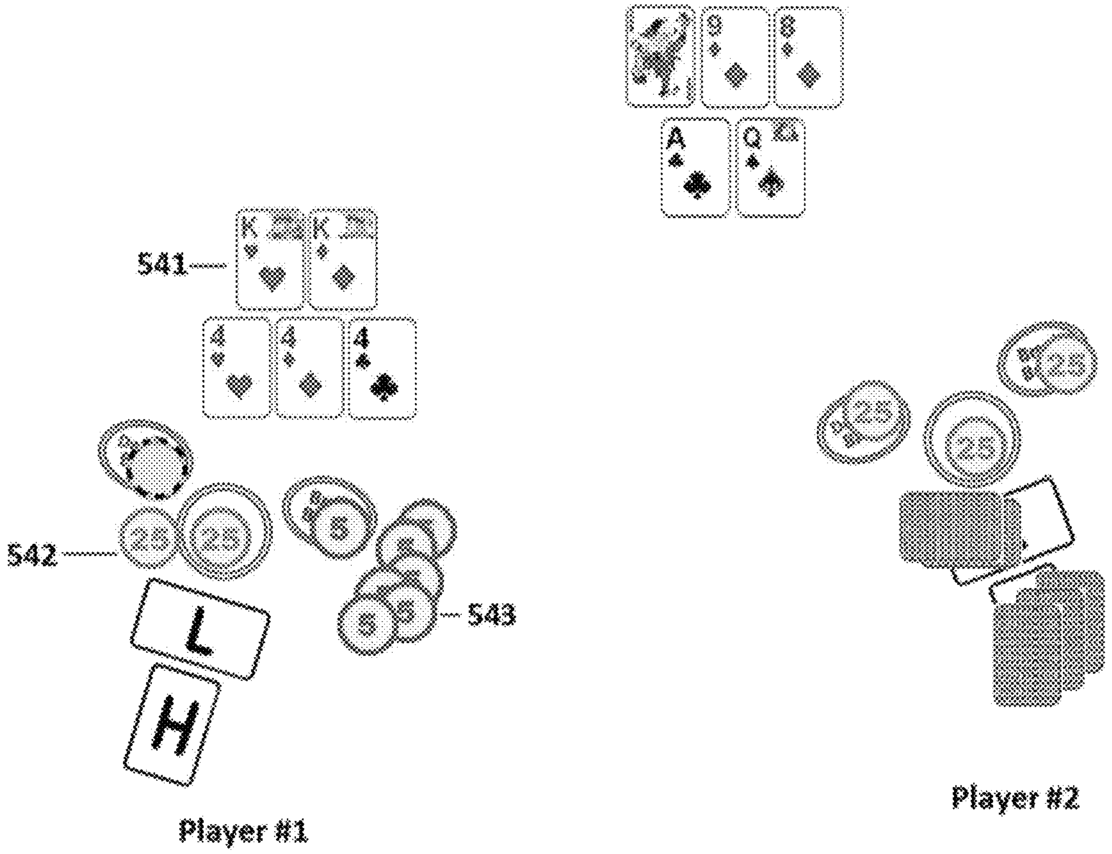

In FIG. 5D, player #1's Dealer Break wager is lost because the dealer does not have a Lucky Break. Area 541 shows player #1 has a trips Lucky Break of [KK-444]. Since the dealer does not have a Lucky Break, player #1 wins $25, an even money, on the main bet at area 542. Player#1 has a trips Lucky Break, in one preferred embodiment, the bonus payout is $30, 6 to 1, as shown at area 543.

Figure 5E:
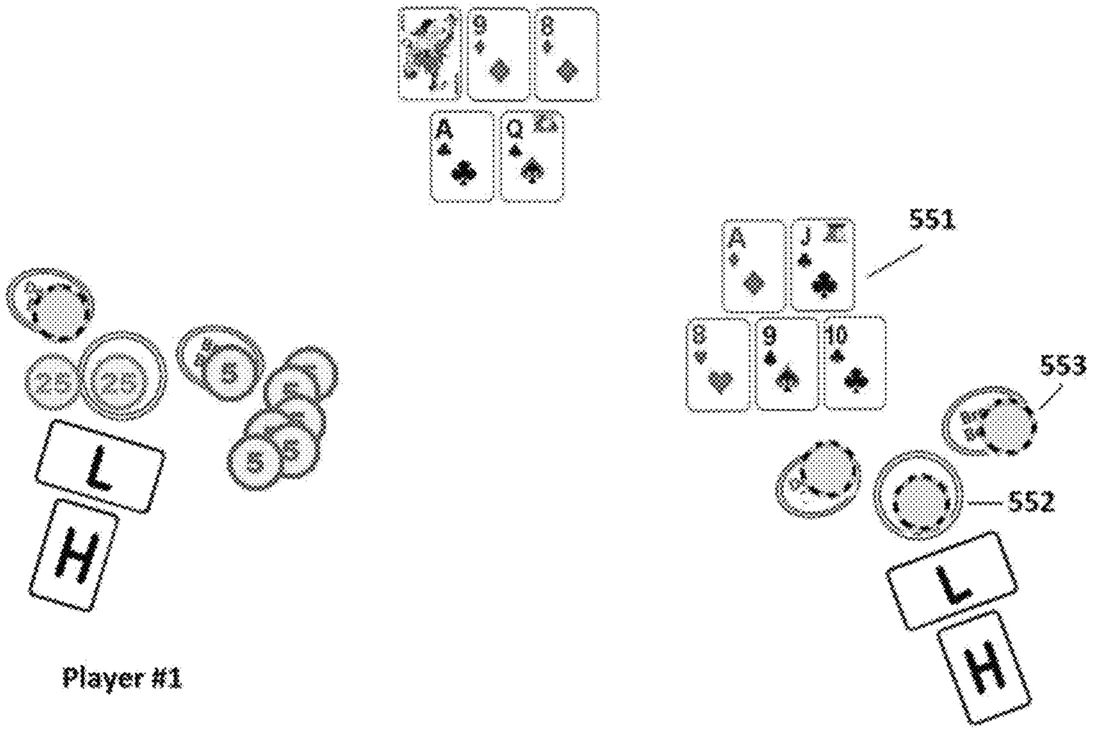

In FIG. 5E, player #2's Dealer Break wager is lost because the dealer does not have a Lucky break. Area 551 shows player #2 does not have a Lucky Break with [AJ-89T]. The dealer and player #2 compete their hands: the dealer wins the Low hand with [AQ] over [AJ], and the dealer also wins the High hand with [8-9-Joker] copies player #2's High hand[8-9-T]. Therefore, player #2's main bet at area 552 is lost. Play #2 does not have a Lucky bet, so his Break Bonus wager at 553 is lost. This round of play ends.

The house (dealer, casino) has a reasonable advantage because the house wins copied (tied) hands, and because the house pushes the player's main wager when the dealer's hand is not qualified (the dealer does not qualify). Other versions can include: dealing 5 cards to each hand; dealing 6 cards to each hand and allowing for discarding one card; playing with 3, 4 or 5 community cards to be shared by every player and the dealer; allowing players to exchange the un-wanted cards with the un-used cards for a fee; and wagering on special bonus hands based upon the cards that remain un-dealt.

In a further embodiment, the game can be played with physical Mahjong-like tiles instead of physical playing cards. There exists certain synergy between Break Poker and Mahjong games. As a matter of fact, the Break Poker game rules shown above can be played with new inventive Mahjong-like tiles in the game referred to herein as Casino Mahjong.

Figure 6:
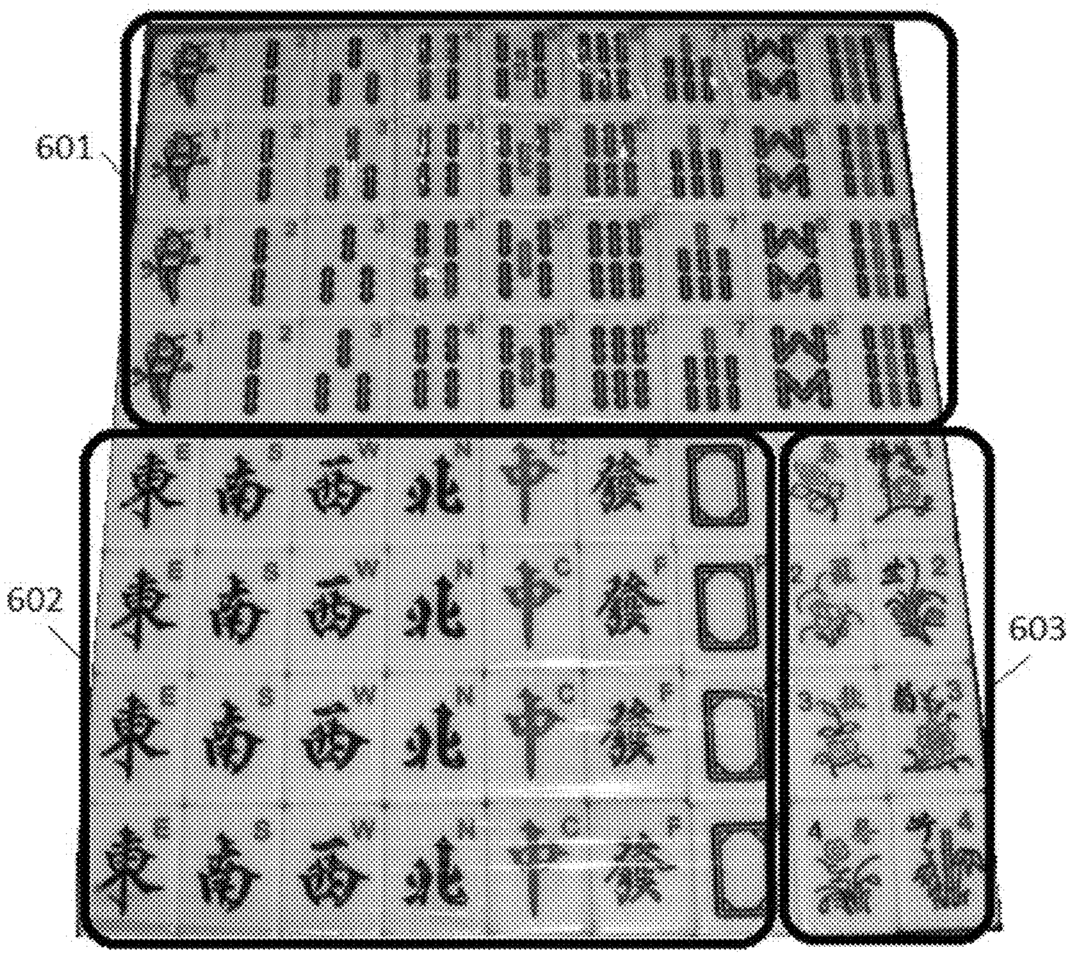
FIG. 6 is an illustration of the traditional Mahjong tiles.
Figure 7:
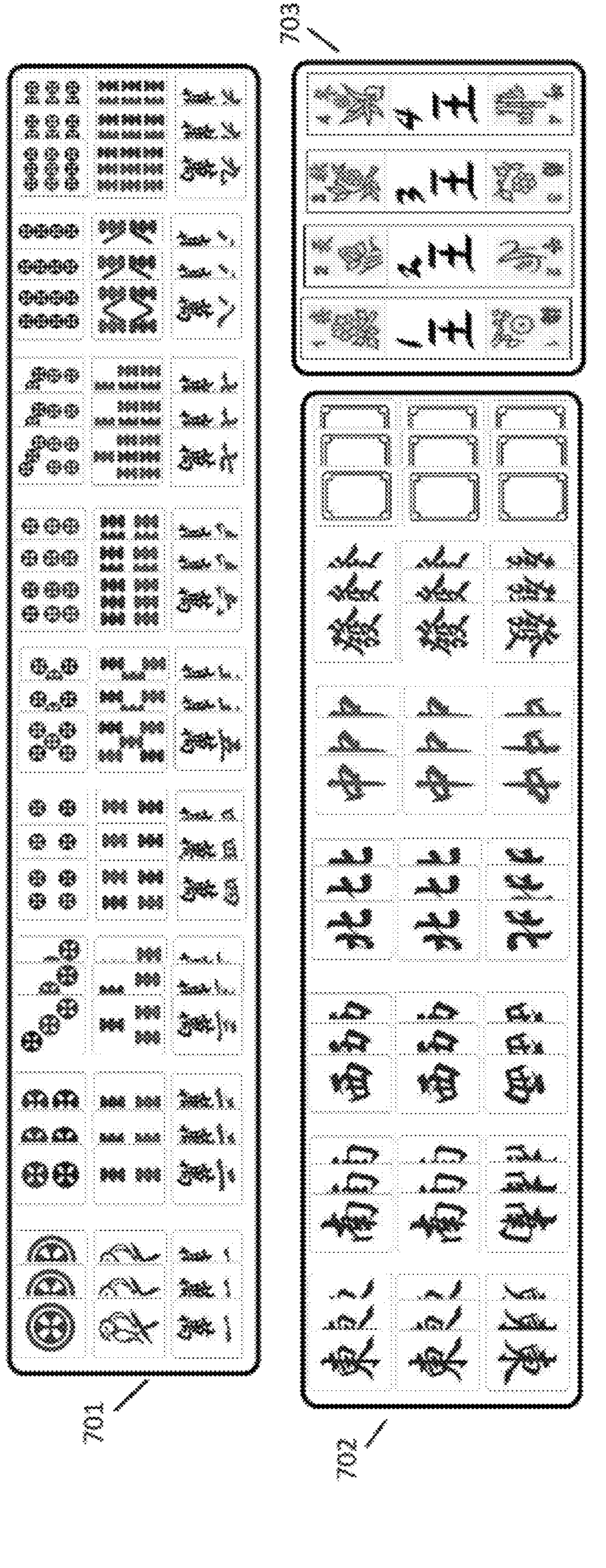
FIG. 7 is an illustration of the inventive Mahjong-like tiles, according to one embodiment.

First, we introduce the new tiles with Mahjong symbols for Casino Mahjong. The traditional Mahjong tiles are shown in FIG. 6. Area 601 includes are numeric tiles, area 602 includes all character tiles and area 603 includes Flowers and Seasons tiles (also referred to as Dragon tiles). The inventive tiles are created by (1) "stacking" the numeric tiles (Tong, Tiao, Wan) of the same values in the traditional Mahjong in tandem on one tile, i.e., each numeric tile now contains 3 Mahjong symbols (2) tripling (or doubling) the character, Flower and Season tiles on one tile. FIG. 7 shows one design of the new tiles. Area 701 includes all numeric tiles, area 702 includes all character tiles and area 703 includes Flowers and Seasons tiles. After stacking the Tong, Tiao, and Wan three symbols in one tile, the original "suits" in the traditional numeric tiles become immaterial; every stacked numeric tile has only one value. Because the original Mahjong symbols are on the new tiles, the excitement of touching/feeling the tile surfaces without visually seeing them in identifying tiles remains. Furthermore, in the preferred embodiment, the new tiles are made with the same materials used in the traditional Mahjong, therefore, the crashing sounds from the tiles stay on.

Other variant designs include having different stacking orders of the 3 Mahjong symbols and/or adding numerical values to the new tiles.

In an embodiment, values for the tiles can be defined as illustrated in Table V.

TABLE V

| |
|---|
| Numeric Tiles: value at 1 to 9 |
| Character Tiles: Zhong (red) is higher than Fa (green) and higher than Bai (white) |
| East is higher than South higher than West higher than North. |
| Flower and Season Tiles: the Joker or the wild tiles |

Furthermore, rankings can be assigned based upon certain commonly acceptable "notions" in the traditional Chinese Mahjong game. Trips (three of a kind or a set) can be defined as three identical tiles. One wild card can be used with two identical tiles to make a trips. Two wild cards can be used with any tile to make a trips.

Three tile straights can be defined as any one of the following: any three tiles of sequential numbers; any three character tiles of East, South, West and North, if used, make a straight (e.g. East-West-North or East-South-North); any three character tiles of Zhong, Fa and Bai, if used, make a straight (e.g. Zhong-Fa-Bai); one wild tile (i.e. Joker) can be used with two connected numeric tiles or two hopped tiles to make a straight (e.g., Joker-8-9); one wild tile (i.e. Joker) can be used with two tiles of different characters to make a straight (e.g., Zhong-Fa-Joker).

A pair is two identical tiles. A wild card can be used with any character or numerical tile to make a pair. In an embodiment, a wild card can only be used with a character tile or Zhong to make a pair.

Regarding a singleton, in one embodiment, the wild card is higher than Zhong and thus: Joker>Zhong>Fa>Bai>East>South>West>North>9>8>7 . . . >2 >1. In another embodiment, the wild tile has the same ranking as Zhong, the highest singleton.

Hands can be ranked according to Table VI. Of course other rankings can be used as well.

TABLE VI

| |
|---|
| Pair: Pair of Jokers is higher than pair of Zhong and so on |
| Straight: high straights outrank low straights |
| Trips: high trips outrank low trips |
| Trips outrank straights and outrank pairs and single tiles |

In one embodiment, the game using Mahjong tiles is played with 37 tiles consisting of: 3 of each numeric tiles, one to nine [Tong-Tiao-Wan], a total of 27 tiles; 2 of each Zhong, Fa and Bai, a total of 6 tiles; 4 Flow/Season tiles, the wild (Joker) tiles.

Figure 8:
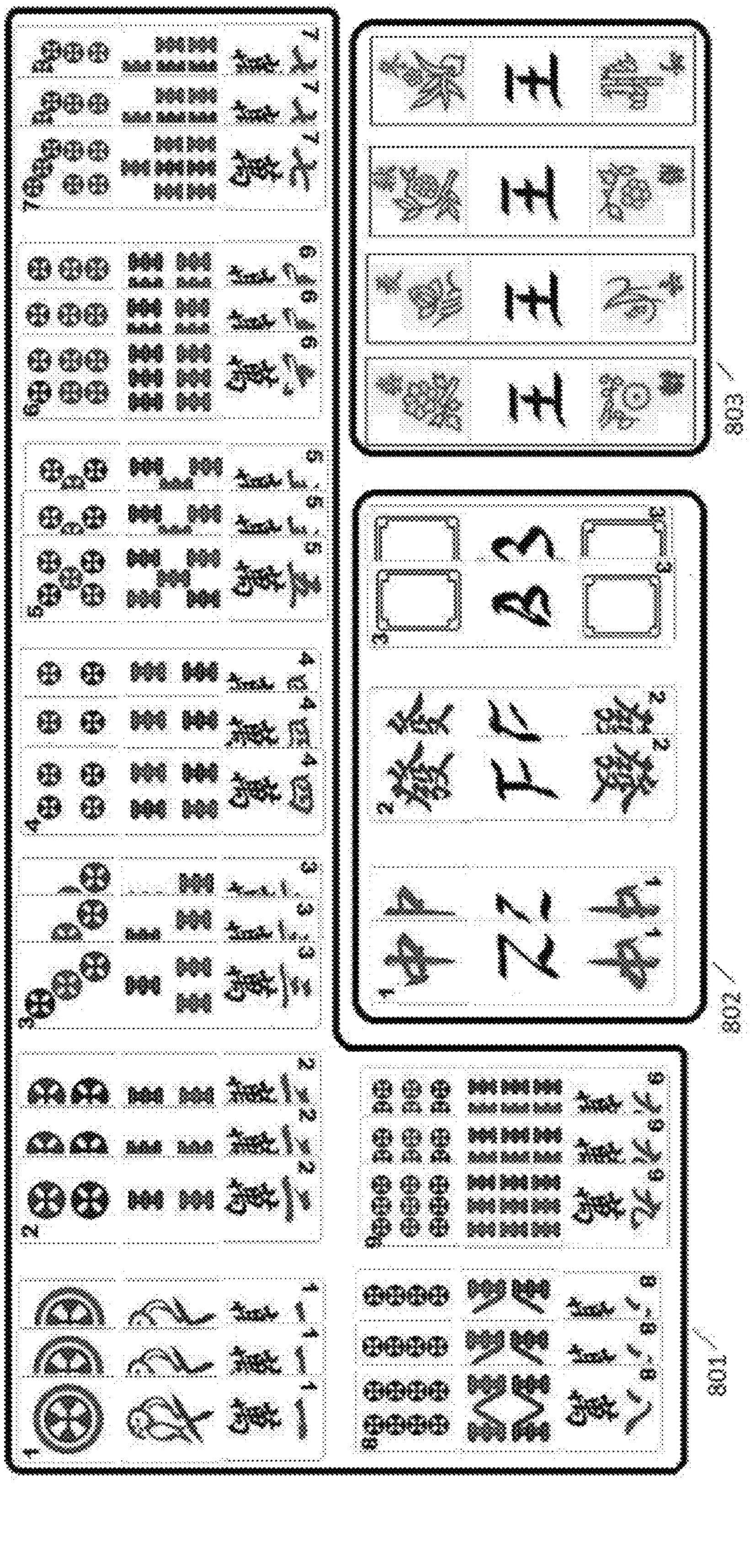
FIG. 8 is an illustration of the complete set of tiles used in Casino Mahjong, according to the preferred embodiment.

FIG. 8 shows the complete set of 37 tiles used in Casino Mahjong. Area 801 includes 27 numeric tiles, area 802 includes 6 character tiles and area 803 includes 4 Flowers and Seasons tiles as Jokers.

Figure 9:
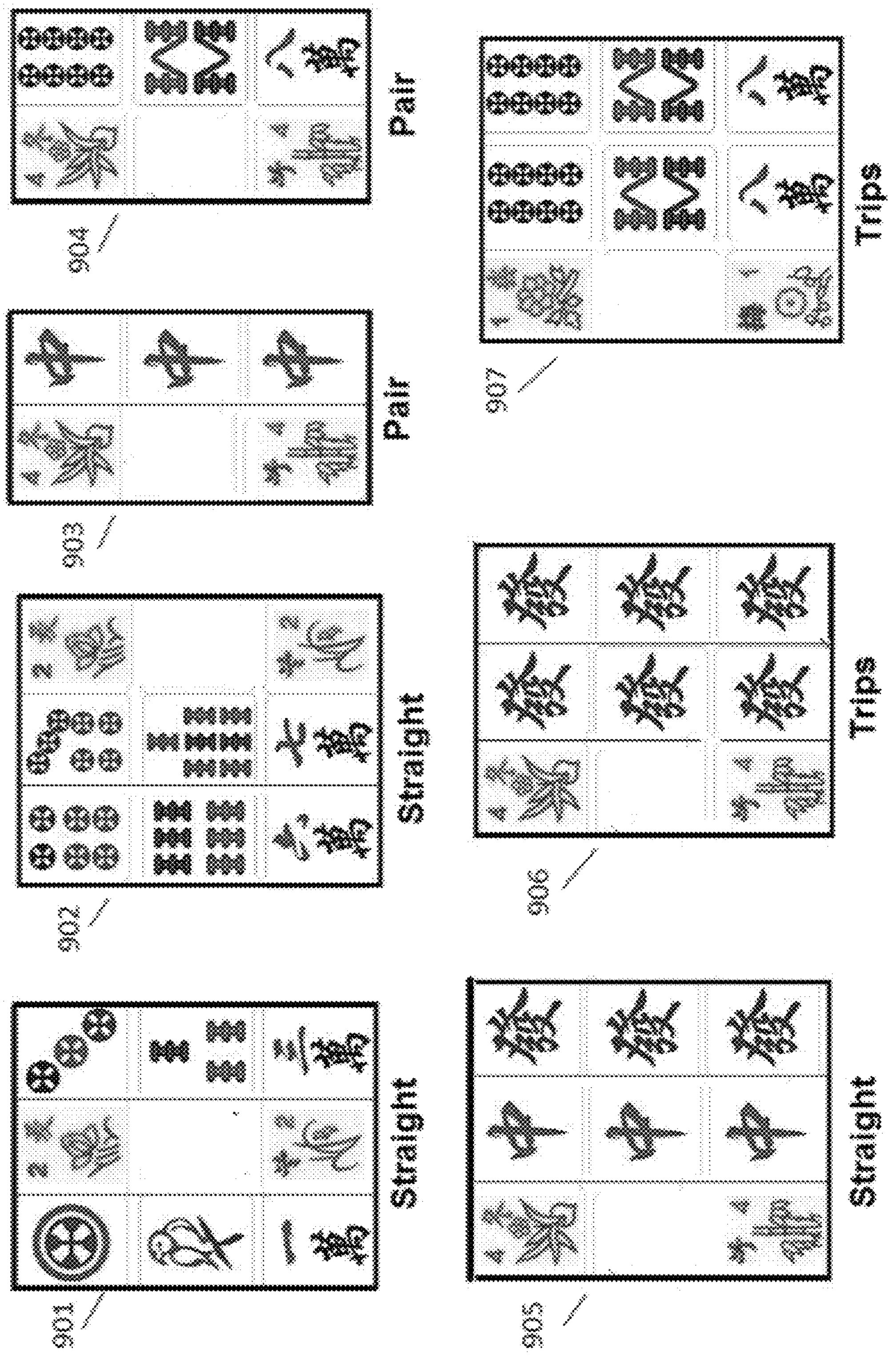
FIG. 9 is an illustration of the use of Wild/Joker tile in Casino Mahjong, according to the preferred embodiment.

FIG. 9 shows examples of straights, trips and pairs using Jokers in Casino Mahjong. Hand 901 is a [1-Joker-3] straight; hand 902 is a [6-7-Joker] straight; hand 903 is a 2-tile [Joker-Zhong] pair; hand 904 is a 2 tile [Joker-8] pair; hand 905 is a [Joker-Zhong-Fa] straight; hand 906 is a [Joker-Fa-Fa] trips and hand 907 is a [Joker-8-8] trips.

To begin the game, every player and the dealer are dealt with 5 tiles. With 6 positions and the dealer in the play, there are always 2 unused tiles. Each player and the dealer get 5 tiles and separate the 5 tiles to 2 hands: Low hand having 2 tiles and High hand has 3 tiles. The High hand must have a ranking at least as high as the Low Hand or higher. When a participant's 5-tile hand contains one pair as the 2-tile Low hand and a straight or trips as the 3-tile High hand, the hand is called Mahjong. Otherwise the hand is a non-Mahjong hand.

A "Mahjong" in Casino Mahjong is equivalent to "Lucky Break" in Break Poker. In one embodiment, the hand rankings can be defined according to Table VII. Of course, this is just one set of rankings and other rankings can be used as well.

TABLE VII

| |
|---|
| A Mahjong hand outranks any non-Mahjong hand |
| The 3 card "High" hand rankings are: |
| Trips > Straights > Pairs > High tile |
| Higher Trips > Lower Trips |
| Higher Straights > Lower Straights |
| Higher Pairs > Lower Pairs |
| High tiles: Zhong > Fa > Bai > 9 > 8 > 7 . . . > 2 > 1. |
| A Joker can be used to make a trips, a straight or a pair. |
| The 2 card "Low" hand rankings are: |
| Higher Pairs > Lower Pairs |
| High tiles: Zhong > Fa > Bai > 9 > 8 > 7 . . . > 2 > 1. |
| A Joker can be used with any tile to make a pair. |

As can be appreciated, similar to Break Poker, Casino Mahjong could include the same side bets: Mahjong Bonus, Dealer Mahjong, 2 Tile Bonus, and Progressive Bonus bet.

Figure 10A:
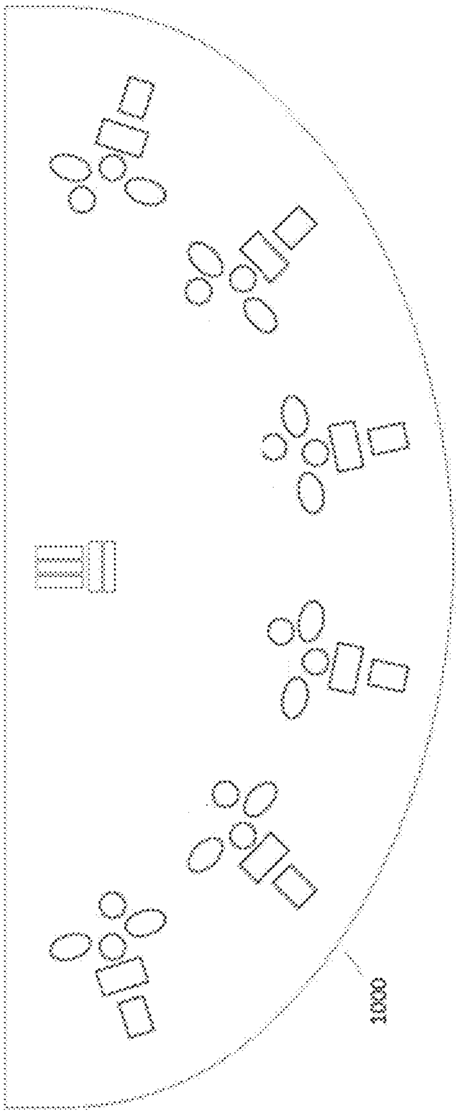
FIG. 10A is an exemplary table layout that can be used to implement Casino Mahjong wagering game, according to the preferred embodiment.

FIG. 10A is an exemplary table layout that can be used to implement Casino Mahjong wagering game, according to an embodiment. Area 1000 is the table layout for the wager game; there is one dealer position and 6 player wagering positions.

Figure 10B:
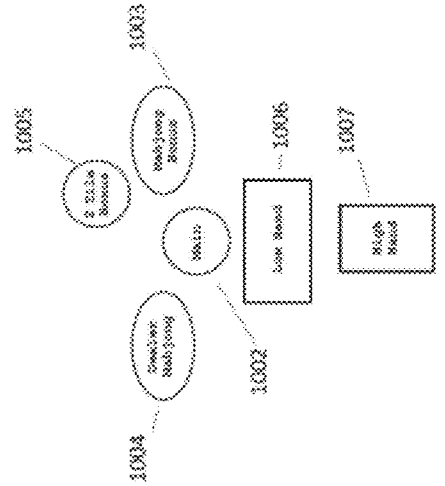
FIG. 10B is an exemplary betting layout used for each player in Casino Mahjong, according to the preferred embodiment.

FIG. 10B is an exemplary betting layout used for each player, according to an embodiment. A main wager betting area 1002 is used to place the main bet and there are 4 side wager betting areas: 1003 for Mahjong Bonus, 1004 for Dealer Mahjong, and 1005 for 2 Tile Bonus. Areas 1006 and 1007 are used for the player to palace the 2-tile Low and 3-tile High hands. The addition of the Jackpot progressive side bet is an apparent variant.

In one embodiment, the dealer's qualifying hand is one character-high or better. The dealer must set the hands according to the House Way and a player can set his hand any way he wishes as long as the back "High" hand outranks the front "Low" hand. In one embodiment the House Way for casino Mahjong is defined in Table VIII.

TABLE VIII

| |
|---|
| If the dealer can make a hand of Pair/Trips (a Mahjong), he does so, putting the highest pair possible for the two-tile hand. |
| Otherwise, if the dealer can make a hand of Pair/Straight (a Mahjong), he does so, putting the highest pair possible for the two-tile hand. |
| Otherwise, if the dealer can make a hand of Pair/Pair, he does so, putting the highest possible pair for the two-tile hand. |
| Otherwise, if the dealer can make a hand of No Pair/Trips, he does so, putting the highest possible two tiles for the two-tile hand. |
| Otherwise, if the dealer can make a hand of No Pair/Straight, he does so, putting the highest possible two tiles for the two-tile hand. |
| Otherwise, if the dealer can make a hand of No Pair/Pair, he does so, putting the highest possible two tiles for the two-tile hand. |
| Otherwise, the dealer puts the highest possible two tiles for the two-tile hand. |

Figure 11:
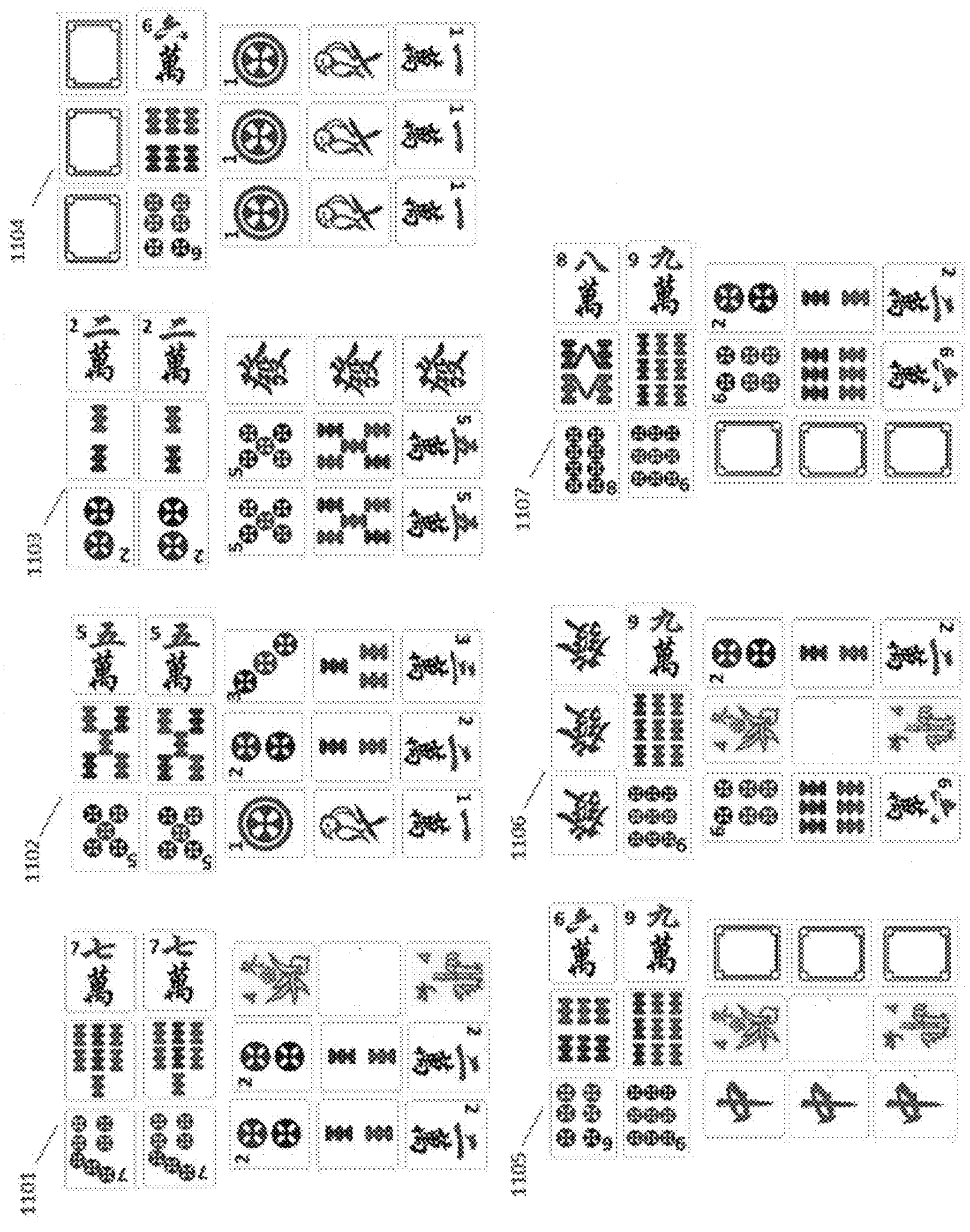
FIG. 11 is an illustration of House Way for Casino Mahjong, according to the preferred embodiment.

FIG. 11 is an illustration of House Way for Casino Mahjong, according to one embodiment. Hand 1101 has a Mahjong of [7-7, 2-2-Joker]; hand 1102 has a Mahjong of [5-5, 1-2-3]; hand 1103 has a pair/pair of non-Mahjong [2-2,5-5-Fa]; hands 1104 has a no-pair/trips of non-Mahjong [6-Bai, 1-1-1], hand 1105 has a no-pair/straight of non-Mahjong [6-9,Zhong-Joker-Bai]; hand 1106 has a no-pair/pair of non-Mahjong [Fa-9, 6-Joker-2], a pair of 6's; hand 1107 has a no-pair/no-pair of non-Mahjong [8-9, Bai-6-2].

A player's Play bet is betting against the dealer's hand. Table IX shows how the Play bet can be resolved.

TABLE IX

| |
|---|
| A Mahjong hand outranks any non-Mahjong hand. |
| Player's front "Low" hand competes against dealer's front "Low" hand and player's "High" back hand competes against dealer's "High" back hand. |
| Dealer wins the equal racking hands, called "copy" |
| Player's Play bet wins if both the player's "Low" and "High" hands outrank the dealer's two hands respectively; |
| Player's Play bet pushes if only one of player's "Low" and "High" hands outrank the dealer's hand and the other one loses; |
| Player's Play bet loses if both the Player's "Low" and "High" hands under-rank and/or equal rank the dealer's two hands respectively; |
| For two competing Mahjong hands, the hand resolution rules are the same as points above. |

A player's Mahjong Bonus bet is playing against a payout table. When a player has a Mahjong hand, he wins with multiples as bonus. In one embodiment, a payout table can be illustrated in Table X. When the player does not have a Mahjong hand the player loses the bet.

TABLE X

| | |
|---|---|
| 5-of-a-kind, all characters | 200 to 1 |
| 5-of-a-kind, all numbers | 100 to 1 |
| Trips Mahjong, all numbers | 50 to 1 |
| Trips Mahjong | 10 to 1 |
| Mahjong | 4 to 1 |
| No Mahjong hand | lose |

The dealing procedure for Mahjong are similar to those in Break Poker (illustrated in FIG. 1A) and does not need be repeated herein.

FIG. 12 shows an exemplary round of Casino Mahjong, according to an embodiment.

FIGS. 12-A to 12-E are an illustration of an exemplary round of play, according to an embodiment; the Mahjong Bonus, Dealer Mahjong, 2-Tile Bonus and Progressive side bets are not depicted.

Figure 12A:
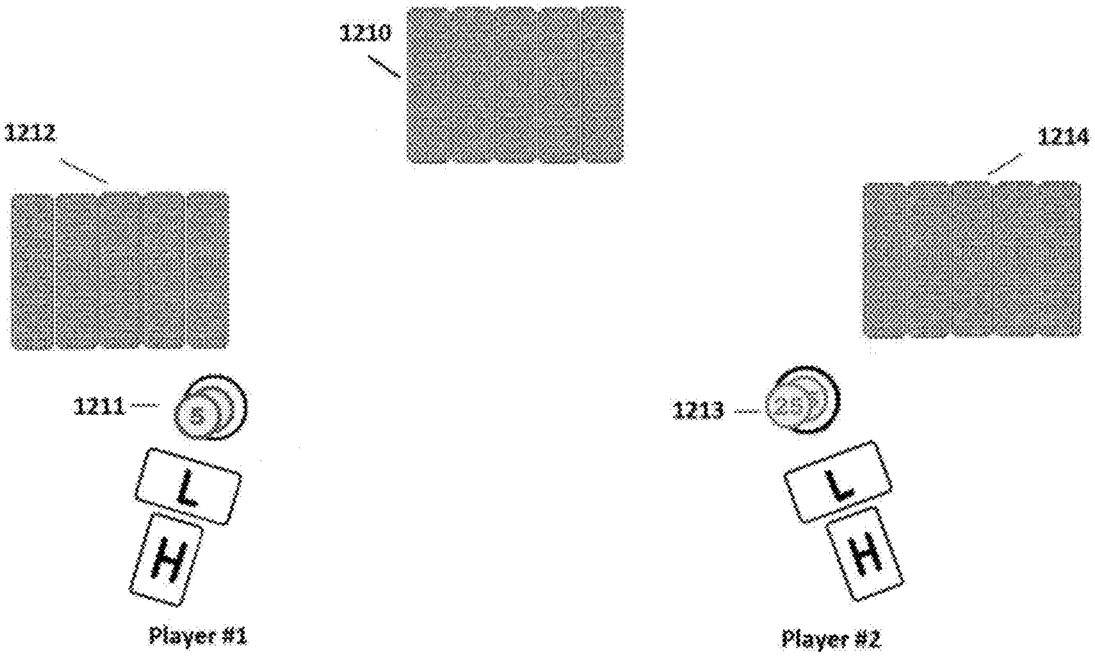
FIGS. 12A-12E are an illustration of one round of Casino Mahjong play when the dealer is qualified, according to the preferred embodiment.

In FIG. 12A, Player #1 places $10 for the main bet at area 1211 and received 5 tiles at 1212; player #2 places $50 for the main bet at area 1213 and receives 5 tiles at 1214. The dealer receives his 5 tiles at area 1210.

Figure 12B:
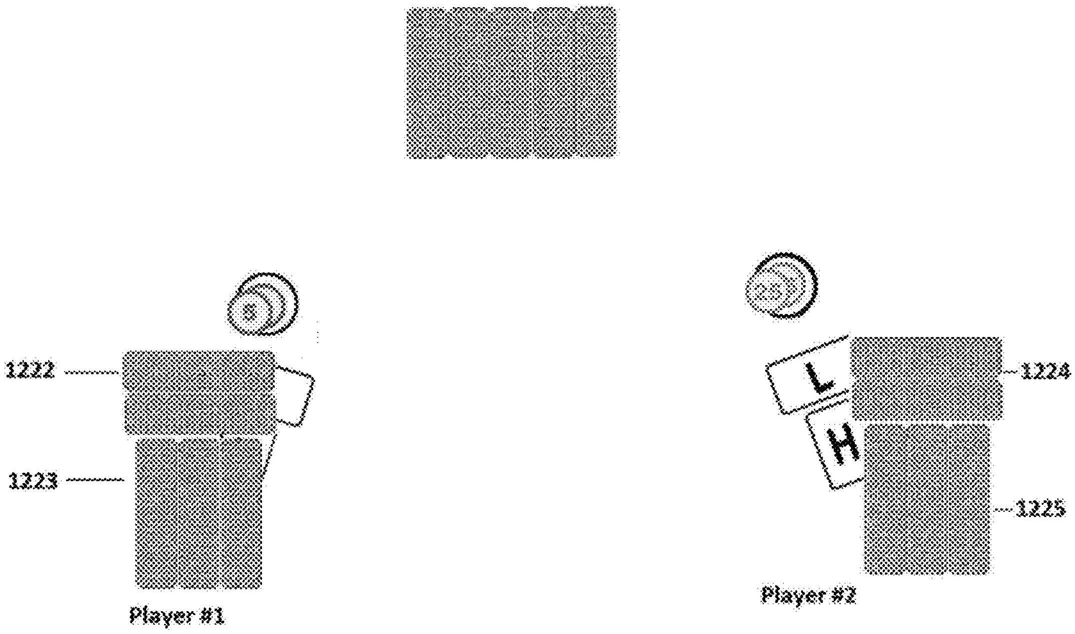

In FIG. 12B, player #1 sets his 5 tiles to a 2-tile hand and a 3-tile hand, with the restriction that the 3-tile hand must be at least as high in rank as the 2-tile hand. Player #1 puts down the low and high hands at areas 1222 and 1223 separately; Player #2 puts down the low and high hands at areas 1224 and 1225 separately.

Figure 12C:
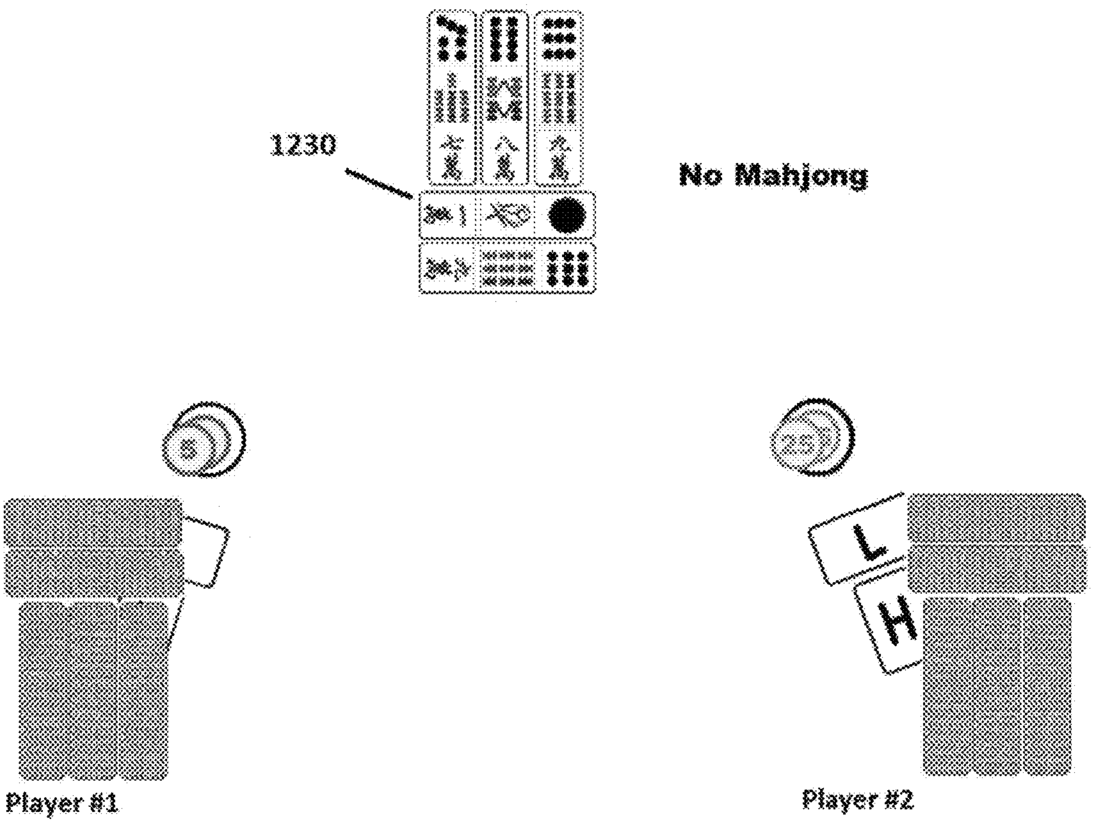

In FIG. 12C, the dealer sets his hand according to the House Way. In this exemplary play, area 1230 shows the dealer's hand is set to a no-pair/straight of [1-9, 7-8-9]. The dealer's hand is non-Mahjong.

Figure 12D:
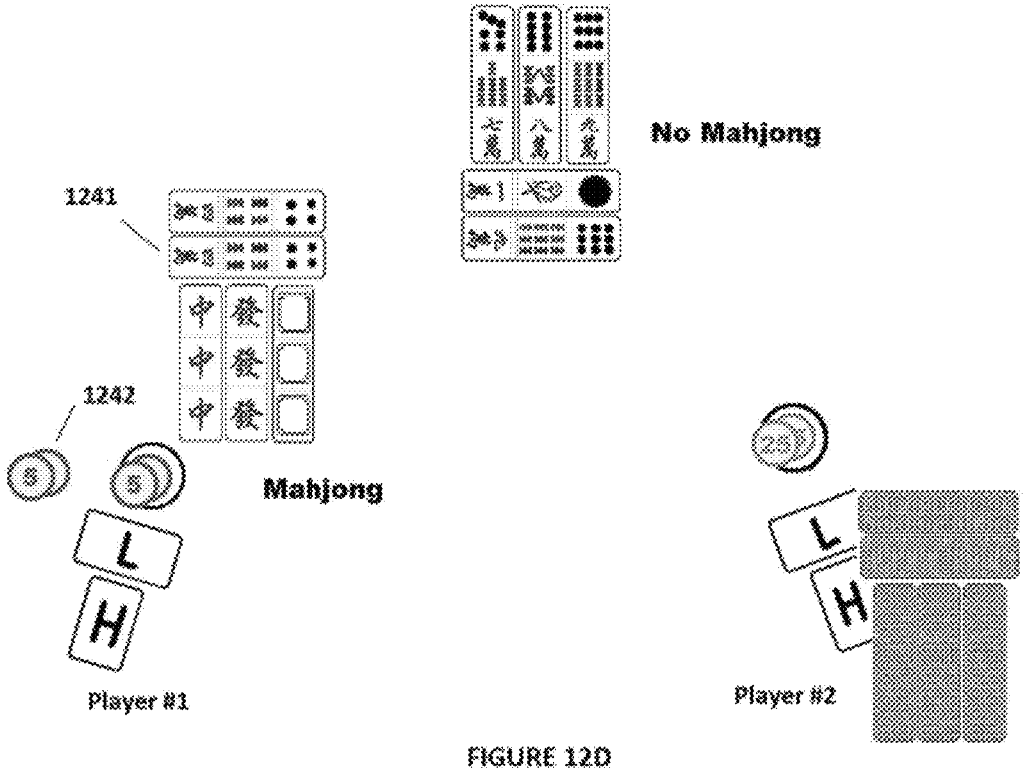

In FIG. 12D, player #1's is revealed and area 1241 shows it has a Mahjong of [4-4, Zhong-Fa-Bai]. In one embodiment, a Mahjong hand wins over a non-Mahjong hand, at area 1242, player#1's main bet receives $10, an even money payout.

Figure 12E:
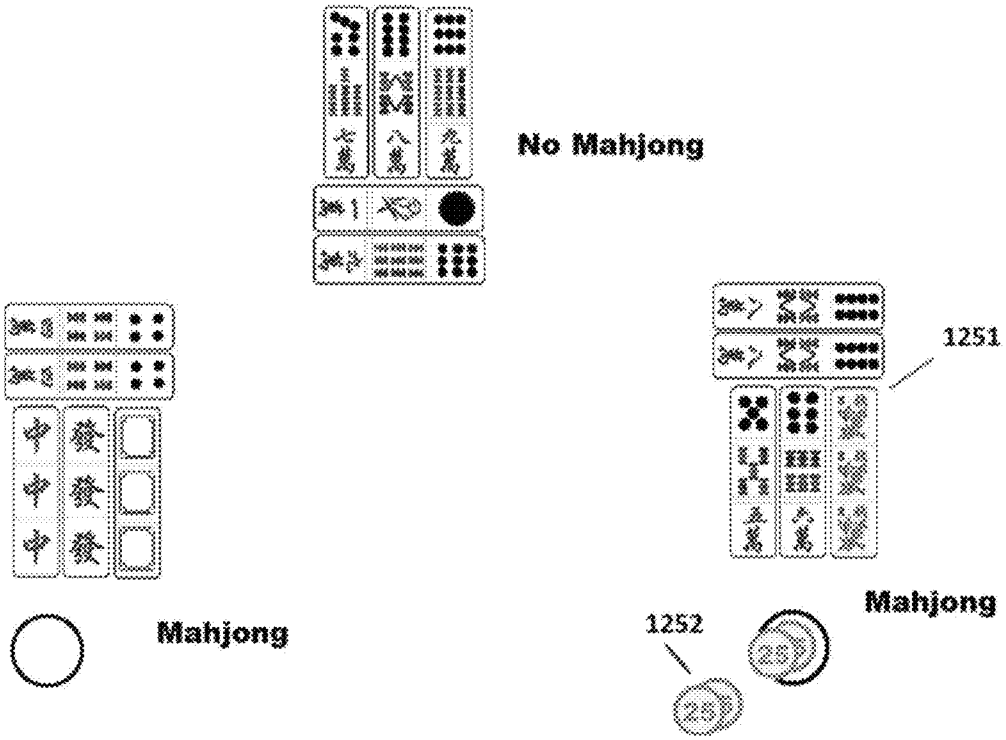

In FIG. 12E, player #2's hand shows to also have a Mahjong of [8-8, 5-6-Joker] at area 1251; area 1252 shows player #2 wins $50, an even money on the main bet.

Further variations of the Casino Mahjong game can include, for example: playing with other numbers of Casino Mahjong tiles (e.g. 52 or 45 tiles); dealing each player more than 5 tiles (e.g. 6 or 7 tiles) and discarding unwanted tile; using community tiles in the game; assigning different ways to use the "Jokers"; and allowing for exchanging the original tiles for the un-used tiles.

The game can be played by manual dealing/shuffling or by using an automatic Pai Gow or tile machine, as shown in U.S. Pat. Nos. 6,626,435 and 6,113,100.

The Mahjong tiles described herein can have embedded magnetic strip or optical sensor inside, so that the tiles become recognizable (i.e. readable). An automatic shuffler can be developed to shuffle and arrange the tiles.

Figure 13:
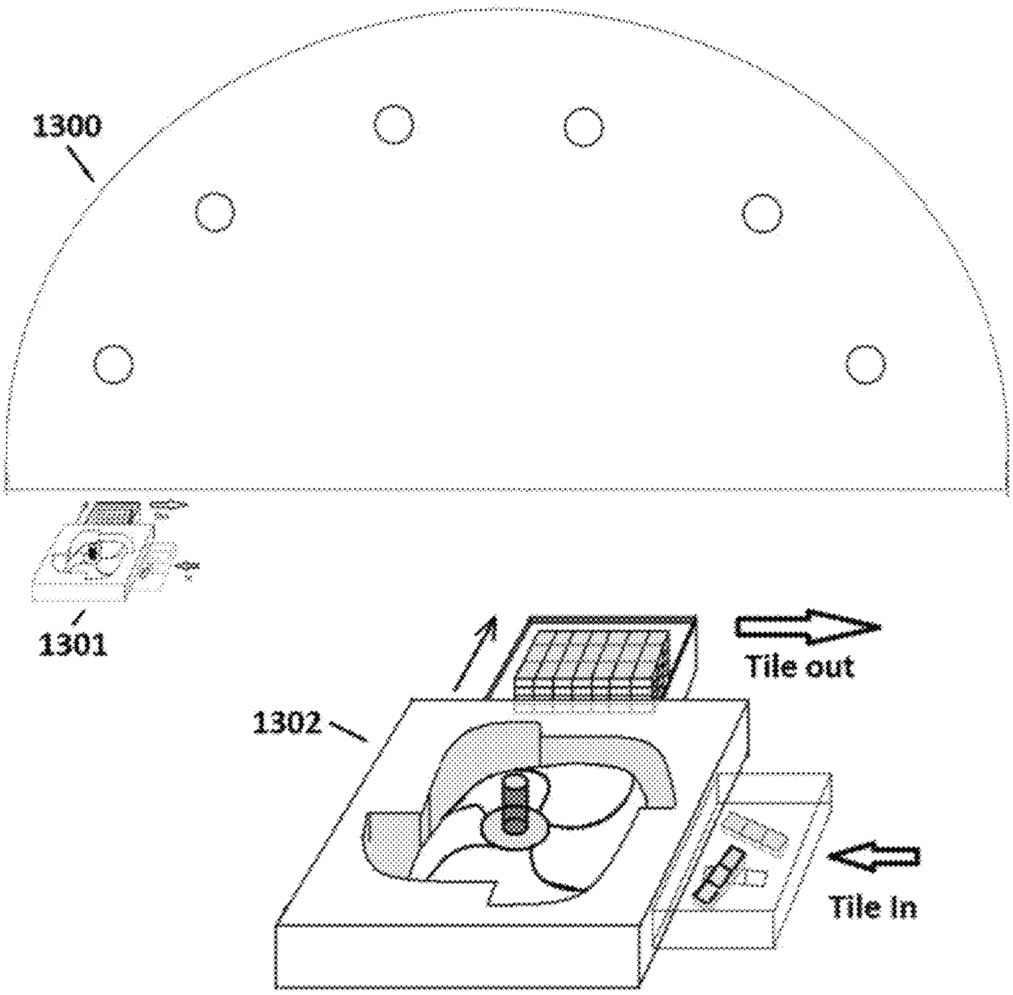
FIG. 13 is an illustration of shuffle machine for the Mahjong-Like tiles.

A schematic design of the shuffler is shown in FIG. 13. Areas 1300 show the table top. In one embodiment, the shuffle machine is attached to the edge or installed at the bottom of a standard casino table at area 1301. The schematic architecture of the shuffle machine is shown at area 1302. The shuffler contains a rotating mechanism for shuffling and an alignment mechanism for preparing the tiles.

All play variations and game apparatus are applicable for every embodiment introduced in this invention.

FIG. 14 illustrates the statistical evaluation of the main bet for the preferred embodiments of Break Poker and Casino Mahjong. FIG. 14A is the results of a 100 million hand simulation of the dealer playing against the player in Break Poker and that the dealer has an edge of 2.09%; FIG. 14B shows the 100 million hand of simulation of the dealer plays against the player in Casino Mahjong and that the dealer has an edge of 2.05%. The synergy between Break Poker and Casino Mahjong is apparent.

Figure 15A:
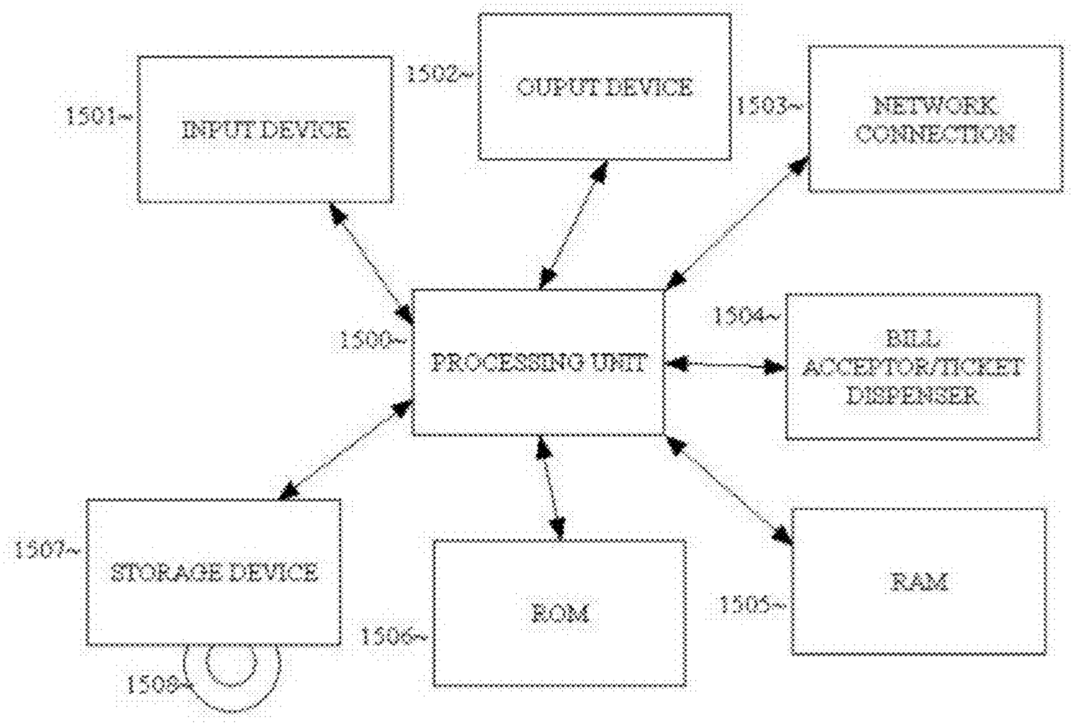
FIG. 15A is a block diagram illustrating hardware that can be used to implement an electronic version of the methods described herein, according to an embodiment.

FIG. 15A is a block diagram illustrating hardware that can be used to implement an electronic version of the methods described herein, according to an embodiment. The hardware illustrated in FIG. 15A can be used to implement an electronic gaming machine or a home computer programmed to implement the methods described herein which can also play the game at an online casino (which serves the game to the player from a remote server).

A processing unit 1500 can be a microprocessor and associated apparatuses (e.g., cache, bus, etc.) The processing unit 1500 can be connected to an input device 1501 (e.g., touch-screen, keyboard, mouse, etc.) and an output device 1502 (e.g., touch-screen, LCD display, speaker, etc.) The output device 1502 can display graphical representations of the game described herein, including a graphical representation of the layout, dice (or other random number generator), chips placed, etc. The processing unit 1500 can also be connected to a network connection 603 which can connect the processing unit 1500 to a computer communications network such as the Internet, LAN, WAN, wifi, etc. The processing unit 1500 can also be connected to a bill acceptor/ticket dispenser 1504 which can accept cash or cashless tickets and convert the amount therein to electronic credits on the electronic gaming machine. The ticket dispenser can also issue a cashless ticket (upon cashout) to the player that can be redeemed by the player for cash (at a redemption kiosk or a cashier). The processing unit 1500 can also be connected to RAM 1505 and ROM 1506 and a storage device 1507 (such as DVD-ROM, CD-ROM drive, EPROM, hard drive, etc.) A non-transitory computer readable storage medium 1508 (such as a DVD, CD, EPROM, disk, etc.) can be read by the storage device 1507. The storage medium 1508 can store instructions (and assets) which can control the processing unit 1500 in order to implement the methods described herein.

Figure 15B:
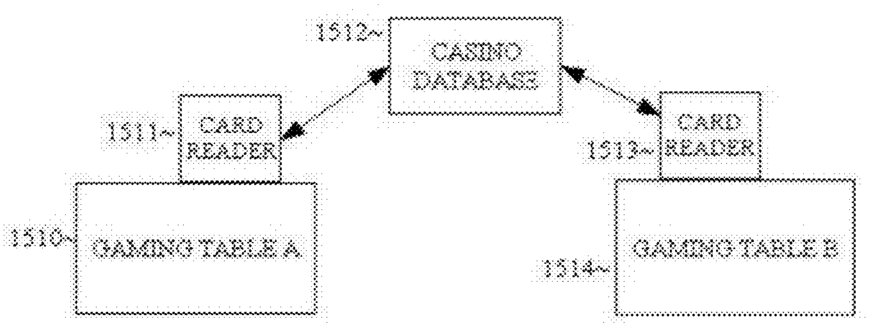
FIG. 15B is a block diagram illustrating hardware that can be used to track play at one or more gaming tables, according to an embodiment.

FIG. 15B is a block diagram illustrating hardware that can be used to track play at one or more gaming tables, according to an embodiment. Typically, casinos like to track play by players so the players can be offered complimentaries, etc.

A casino table A is associated with a card reader 1511 so that a player can present their player's card to the dealer. The dealer can swipe the player's card in the card reader (the card has computer readable coding to electronically identify the card such as a magnetic strip). The card reader 1511 can communicate with electronic casino database 1512. The casino database 1512 can also communicate with card reader 1513 associated with gaming table B 1514 and other gaming tables/card readers (not pictured). The casino database 1512 tracks play at the gaming tables and stores data such as the average bet and time played for players who participate in the player tracking system.

The methods described herein as applied to a physical game include physical structures such as physical dice, physical chips (which can be directly redeemable for cash), a physical stick (used by a dealer to move the dice) and a physical gaming table with a felt layout on a top surface of the table. All methods described herein must be played in either physical or electronic form.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

All of the methods described herein (except for the electronic versions) can be played with a physical deck of cards, tiles and physical chips (directly redeemable for cash) can be used in order to place and resolve wagers. The physical deck of cards can be one standard deck of 52 cards plus one Joker; the physical tiles can be one set of 37 Mahjong-like tiles. The games are played on a physical gaming table which is comprised of felt on top (with the layout printed on it), wooden legs, and other known components (e.g., chip rack, etc.) A mechanical electronic shuffling machine can also be used to shuffle the cards or tiles before dealing Unless otherwise stated, all wagers placed herein can be any amount (subject to table minimum and maximum amounts).

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play an electronic version of a wagering game, the method comprising:

executing, on a processing unit, instructions that perform the following operations:

receiving a main wager from a player;

dealing a player's initial hand and a dealer's initial hand using elements;

allowing the player to set the player's initial hand into a player's high hand and a player's low hand;

allowing the dealer to set the dealer's initial hand into a dealer's high hand and a dealer's low hand;

providing wager resolution rules comprising:

defining a set of particular ranks and a particular rank;

A) if the player's high hand is in the set of particular ranks without comparison to the dealer's high hand and the player's low hand is the particular rank without comparison to the dealer's low hand and the dealer's high hand is not in the set of particular ranks without comparison to the player's high hand or the dealer's low hand is not the particular hand rank without comparison to the player's low hand, then the player wins a payout on the main wager;

B) If the player's high hand is not in the set of particular ranks without comparison to the dealer's high hand or the player's low hand is not the particular rank without comparison to the dealer's low hand and the dealer's high hand is in the set of particular ranks without comparison to the player's high hand and the dealer's low hand is the particular rank without comparison to the player's low hand, then the player loses the main wager;

If A or B have not occurred, then the main wager is resolved based on a comparison between the player's high hand and the dealer's hand high and the player's low hand and the dealer's low hand; and resolving the main wager using the wager resolution rules.

2. The method as recited in claim 1, wherein the particular rank is a pair and the set of particular ranks comprises a straight and a three of a kind.

3. The method as recited in claim 1, wherein the wager resolution rules further comprise: if the dealer's initial hand does not meet a qualifying condition then the main wager pushes instead of being resolved according to other wager resolution rules.

4. The method as recited in claim 3, wherein the qualifying condition is that the dealer's initial hand must have a rank of at least an ace high.

5. The method as recited in claim 3, wherein the qualifying condition is that the dealer's initial hand must have a rank of at least Ace-King high.

6. The method as recited in claim 1, wherein the player's initial hand is exactly seven elements and the dealer's initial hand is exactly seven elements.

7. The method as recited in claim 6, wherein the dealer allows the player to discard two elements out of the seven elements in the player's initial hand and the dealer discards two elements out of the seven elements in the dealer's initial hand.

8. The method as recited in claim 1, wherein the player's low hand is exactly two elements and the player's high hand is exactly three elements, and the dealer's low hand is exactly two elements and the dealer's high hand is exactly three elements.

9. The method as recited in claim 1, wherein the dealer sets the initial dealer's hand according to a predefined house way.

10. The method as recited in claim 1, wherein the allowing the player to set the player's initial hand requires that the player's high hand must rank higher than the player's low hand and the allowing the dealer to set the dealer's initial hand requires that the dealer's high hand must rank higher than the dealer's low hand.

11. The method as recited in claim 1, wherein the comparison is defined as the following set of rules: if the dealer's high hand ranks greater than equal to the player's high hand and the dealer's low hand ranks greater than equal to the player's low hand then the player loses the main wager; if the player's high hand ranks greater than the dealer's high hand and the player's low hand ranks higher than the dealer's low hand then the player wins the main wager; and if none of the above conditions are true then the main wager is a push.

12. The method as recited in claim 11, wherein hand ranks are ranked from highest to lowest as follows: three of a kind, straight, pairs, high card values.

13. The method as recited in claim 1, wherein the elements are cards.

14. The method as recited in claim 13, wherein the cards comprise a standard 52 card deck plus a joker, the joker being wild and taking on other card values.

15. The method as recited in claim 1, wherein the elements are tiles.

16. The method as recited in claim 15, wherein the tiles comprise a set of 37 Mahjong-like tiles

17. The method as recited in claim 15, wherein the tiles also comprise a joker which takes on other tile values.

18. The method as recited in claim 1, wherein when the dealer and the player both have the predefined condition, the main wager pushes.

19. A method to play a wagering game, the method comprising:

providing physical elements on a table and a shuffling machine;

providing an electronic card reader on or near the table in communication with a casino database;

receiving a player's card at the table and swiping the player's card through the reader thereby identifying the player's card in the database;

receiving a main wager from a player;

dealing a player's initial hand and a dealer's initial hand using the physical elements;

allowing the player to set the player's initial hand into a player's high hand and a player's low hand;

allowing the dealer to set the dealer's initial hand into a dealer's high hand and a dealer's low hand;

providing wager resolution rules comprising:

defining a set of particular ranks and a particular rank;

A) if the player's high hand is in the set of particular ranks without comparison to the dealer's high hand and the player's low hand is the particular rank without comparison to the dealer's low hand and the dealer's high hand is not in the set of particular ranks without comparison to the player's high hand or the dealer's low hand is not the particular hand rank without comparison to the player's low hand, then the player wins a payout on the main wager;

B) If the player's high hand is not in the set of particular ranks without comparison to the dealer's high hand or the player's low hand is not the particular rank without comparison to the dealer's low hand and the dealer's high hand is in the set of particular ranks without comparison to the player's high hand and the dealer's low hand is the particular rank without comparison to the player's low hand, then the player loses the main wager;

if A and B have not occurred, then the main wager is resolved based on a comparison between the player's high hand and the dealer's hand high and the player's low hand and the dealer's low hand; and resolving the main wager using the wager resolution rules.

20. The method as recited in claim 16, further comprising receiving a bonus bet from the player, wherein the bonus bet pays on a set of predetermined winning hands comprising 5 of a kind all characters, 5 of a kind all numbers, trips mahjong all numbers, trips mahjong, mahjong.

* * * * *